US011221161B1

(12) United States Patent
Fernando

(10) Patent No.: US 11,221,161 B1
(45) Date of Patent: Jan. 11, 2022

(54) HEAT-PUMP SYSTEM WITH COMBINED VAPOR EXPANSION-COMPRESSION STAGES AND SINGLE-EFFECT VAPOR ABSORPTION UNIT

(71) Applicant: Kalindha Rashmi LLC, Beavercreek, OH (US)

(72) Inventor: Kamal Prithiviraj Fernando, Beavercreek, OH (US)

(73) Assignee: Kalindha Rashmi LLC, Beavercreek, OH (US)

(*) Notice: Subject to any disclaimer, the term of this patent is extended or adjusted under 35 U.S.C. 154(b) by 0 days.

(21) Appl. No.: 16/807,052

(22) Filed: Mar. 2, 2020

Related U.S. Application Data

(63) Continuation-in-part of application No. 16/449,423, filed on Jun. 23, 2019, now Pat. No. 10,612,821.

(60) Provisional application No. 62/693,875, filed on Jul. 3, 2018.

(51) Int. Cl.
  *F25B 25/02* (2006.01)
(52) U.S. Cl.
  CPC .................. *F25B 25/02* (2013.01)
(58) Field of Classification Search
  CPC .... F25B 15/00; F25B 40/06; F25B 2309/023; F25B 9/06; F25B 11/02; F25B 35/00; F25B 37/001; F25B 25/02; F25B 15/06
  See application file for complete search history.

(56) References Cited

U.S. PATENT DOCUMENTS

| 4,171,619 A | * | 10/1979 | Clark | ....................... F25B 25/02 |
| | | | | 62/235.1 |
| 4,285,211 A | | 8/1981 | Clark | |
| 4,503,682 A | | 3/1985 | Rosenblatt | |

(Continued)

FOREIGN PATENT DOCUMENTS

CN 101737997 A 6/2010

OTHER PUBLICATIONS

Aghniaey et al., "A Comparison between the Novel Absorption Refrigeration Cycle and the Conventional Ammonia-Water Absorption Refrigeration Cycle", 10th Annual International Conference on Heat Transfer, Fluid Mechanics and Thermodynamics, Orlando, Florida, Jul. 14-16, 2014, pp. 1-7.

(Continued)

*Primary Examiner* — Elizabeth J Martin
(74) *Attorney, Agent, or Firm* — The Law Office of Patrick F. O'Reilly III, LLC

(57) ABSTRACT

A heat-driven refrigeration/heat-pump system includes at least one vapor expansion stage and at least one vapor compression stage, a condenser, and an evaporator, while the power consumption of the compression stages is fully supplied by the power output of the expansion stages. In the system, a vapor absorber/generator unit is adopted, such that at least one expansion stage is fed by the vapor from the generator, and at least one power stage; compression or expansion, delivers its output stream to the absorber instead of to the condenser. In the new arrangement the expansion stages produce surplus power, facilitating a supplementary refrigeration loop between the evaporator and the condenser to which there is no direct expense of heat from the generator, thereby improving the overall performance of the system.

15 Claims, 11 Drawing Sheets

(56) References Cited

U.S. PATENT DOCUMENTS

| | | | |
|---|---|---|---|
| 5,673,566 A * | 10/1997 | Eames | F25B 25/02 |
| | | | 62/107 |
| 6,170,263 B1 | 1/2001 | Chow et al. | |
| 6,581,384 B1 | 6/2003 | Benson | |
| 7,178,348 B2 | 2/2007 | Stuhlmueller | |
| 7,178,358 B2 | 2/2007 | Inaba et al. | |
| 7,350,372 B2 | 4/2008 | Wells | |
| 7,971,449 B2 | 7/2011 | Peterson et al. | |
| 8,707,720 B2 | 4/2014 | Shiflett et al. | |
| 2003/0000213 A1 | 1/2003 | Christensen et al. | |
| 2004/0216483 A1 | 11/2004 | Inaba et al. | |
| 2008/0060365 A1 | 3/2008 | Sakitani et al. | |
| 2012/0102996 A1 | 5/2012 | Freund | |
| 2019/0120131 A1 * | 4/2019 | Scuderi | F25B 15/06 |

OTHER PUBLICATIONS

Hong et al., "A Novel Ejector-Absorption Combined Refrigeration Cycle", International Journal of Refrigeration, vol. 34, Jul. 16, 2010, pp. 1596-1603.

Aghniaey et al., "Exergy Analysis of a Novel Absorption Refrigeration Cycle with Expander and Compressor", Islamic Azad University of Central Tehran, Indian J.Sci.Res.1(2), Mar. 2014, pp. 815-822.

Wu, Shenyi, "Investigation of ejector re-compression absorption refrigeration cycle", PhD Thesis, University of Nottingham, May 1999, pp. i-xii and 1-128.

Eames et al., "A novel absorption-recompression refrigeration cycle", Applied Thermal Engineering, vol. 18, Issue 11, Nov. 1998, pp. 1149-1157.

\* cited by examiner

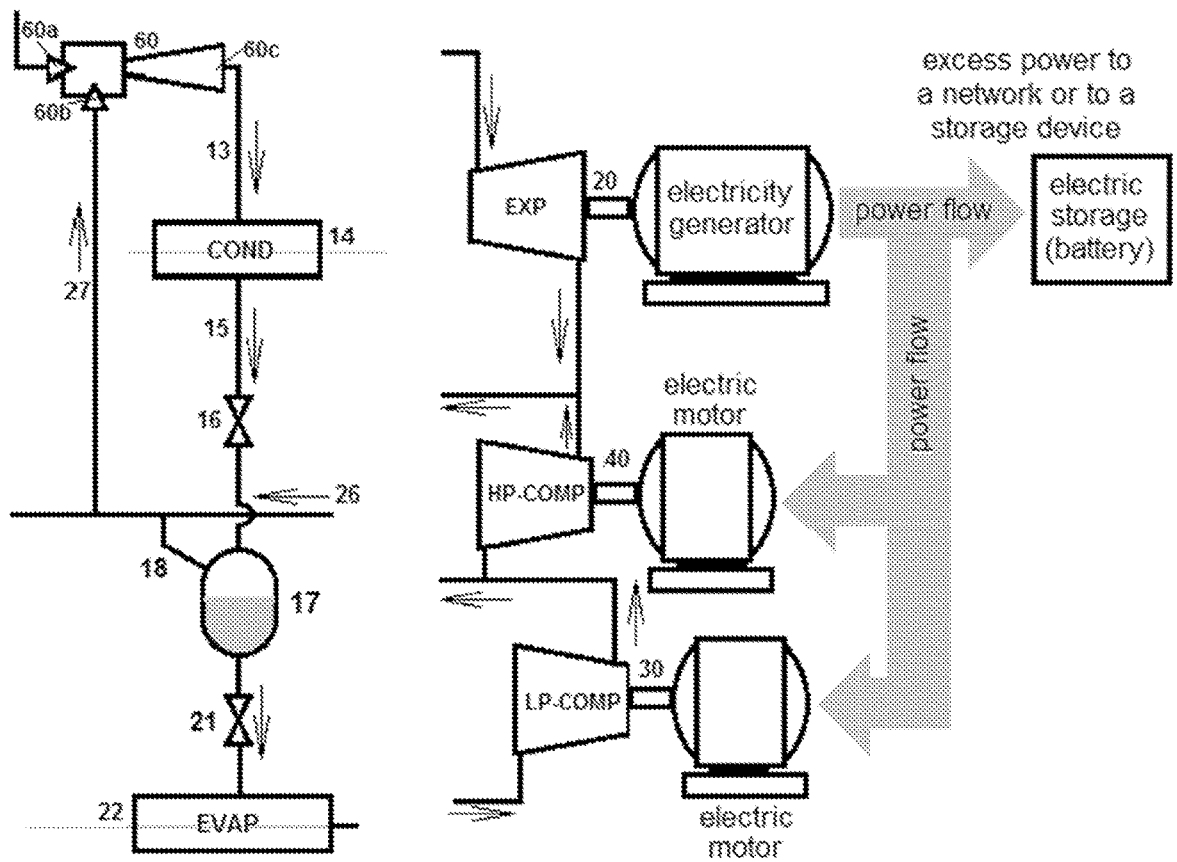
FIG. 1(a) - i     FIG. 1(a) - ii
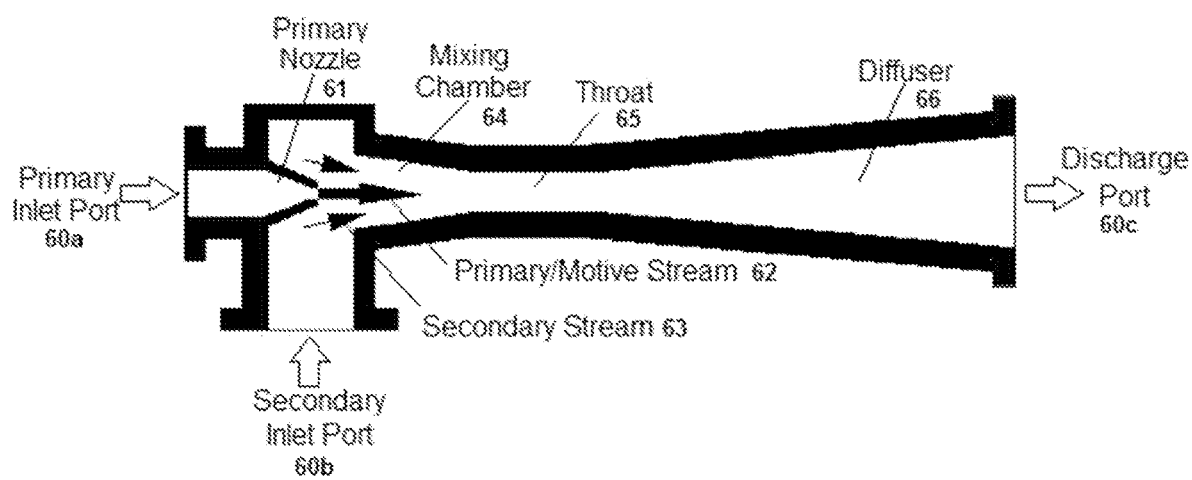
FIG. 1(b) EJECTOR DEVICE

FIG. 2(b)-i

HEAT-PUMP SYSTEM WITH COMBINED VAPOR EXPANSION-COMPRESSION STAGES AND SINGLE-EFFECT VAPOR ABSORPTION UNIT

CROSS-REFERENCE TO RELATED APPLICATIONS

This is a continuation-in-part of U.S. patent application Ser. No. 16/449,423, entitled "Heat-Pump System With Combined Vapor Expansion-Compression Stages And Single-Effect Vapor Absorption Unit", filed on Jun. 23, 2019, and further claims the benefit of U.S. Provisional Patent Application No. 62/693,875, entitled "Heat-Pump System With Combined Vapor Expansion-Compression Stages And Single-Effect Vapor Absorption Unit", filed on Jul. 3, 2018, the disclosure of each of which is hereby incorporated by reference as if set forth in their entirety herein.

TECHNICAL FIELD

The system described herein relates to a heat-driven, refrigerator, chiller, and/or a heat-pump with an expander-compressor device that operates on the principles of mechanically coupled Vapor Expansion Power Cycle (VEPC) and Vapor Compression Refrigeration Cycle (VCRC) where the power requirement of the refrigeration cycle is fully supplied by the power cycle. In order to enhance the performance of the above combined two cycles, the conventional boiler of VEPC is replaced with a vapor generator/absorber unit in which a suitable solution comprises of the same working fluid as the refrigerant and a suitable absorbent is recirculated. Thus, the system described herein can be categorized as enhancing performance of a vapor-compression refrigeration system coupled with a vapor-expansion power cycle by exploiting a single-effect vapor absorption unit.

BACKGROUND

Heating and cooling of the building sector accounts for 40% of total energy consumption in large economies such as United States of America (USA), Canada, China, India, and European Union. The USA, where almost 90% of homes have air conditioning, uses as much electricity to keep buildings cool as the total electricity used in the entire continent of Africa. Although air conditioning is still relatively uncommon in low-income, developing countries, this is poised to change dramatically. Worldwide power consumption for air conditioning alone is forecast to surge 33-fold by 2100 as income levels of the developing world rise and urbanization advances. By the mid-century, the world will use more energy for cooling than heating. The growth is not driven by high-income countries like USA, instead by middle-income countries where households and businesses are buying air conditioners at astonishing rates.

Apart from air-conditioning to enhance comfortable living, other cooling requirements have become a significant part of twenty-first century life in advanced economies: most food in the developed world is chilled or frozen; medicines, including vaccines, need refrigeration; industries such as steel, chemicals, petroleum, and plastics depend on cooling; social media networks and data centers, which power the internet and other information resources, require cooling systems to run continuously and reliably to prevent a system collapse.

However, meeting the increased demand for electricity will be an enormous challenge. Trillions of dollars of investments will be required in electricity generation and transmission infrastructure. In addition, most electricity worldwide continues to be generated using fossil fuels, so this growth in air conditioning would result in striking increases in carbon dioxide emissions. The generation of power accounts for the majority of greenhouse gas emissions and associated climate change, which is the most serious challenge currently faced by all earth's inhabitants. It is predicted that cooling the built-environment makes the planet hotter. These challenges emphasize the necessity of developing greener, sustainable cooling systems that minimize the negative human impacts on the natural surroundings, materials, resources, and processes that prevail in nature.

Heat-driven air conditioning systems and heat-pump systems use low-grade thermal energy like solar energy and waste heat rather than electricity. These systems can produce significant energy savings, have low global warming and ozone depletion potential, and ensure higher indoor air quality. Studies have demonstrated that such heating/cooling equipment is applicable to wide ranges of climate conditions and offers a feasible alternative to conventional heat-pump systems driven by electricity. In the present disclosure, an innovative heat-driven refrigerator/heat-pump system, which comprises of a single-effect absorption unit that operates in conjunction with a combination of expanders and compressors is presented. In this section, the expander-driven vapor compression refrigeration device and the heat-driven vapor absorption refrigeration device are described briefly as they form the basis for the illustrative embodiments. Further, since some of the illustrative embodiments presented in this disclosure utilize ejector devices, a brief description of the working principles of the ejector devices will also be included in this section.

Vapor Expansion Power Cycle Driven Vapor Compression Refrigeration System (VEPC-VCRS)

The heart of this system comprises of an expander and a compressor which are mechanically linked through their shafts so that the power consumption of the compressor is fully met by the power output of the expander while a common working fluid is used in both devices. The expander is fed with hot vapor of the working fluid from a suitable vapor-producing device such as a boiler where the high-pressure working fluid in the liquid form is vaporized. An optional superheater may be used to further increase the temperature of the vapor generated by the boiler. The compressor extracts the low-pressure vapor of the working fluid from the evaporator where a cold-effect is produced by allowing the working fluid in the liquid form to vaporize at a low pressure and a low temperature. Both power units, the expander and the compressor deliver their outlet vapor streams to a common condenser where the vapor condenses rejecting heat to the condenser cooling medium. The condensate collected in the condenser is split into two streams, of which one stream is pumped to the high-pressure boiler using a mechanical pump, while the other stream is allowed to flash into the evaporator through a throttle valve.

This system can be operated with a variety of working fluids such as common refrigerants, organic fluids, natural refrigerants including water, which could be single pure fluid or mixture of multiple fluids. The coefficient of performance (COP), which is the cold-effect (in terms of heat) produced per unit heat supplied to the boiler/superheater, depends on the operating temperatures of the boiler, evaporator, and the condenser, and the working fluid used in the system. For example, a system which runs on water as the working fluid, the COP is in the range 0.5~0.7, when the boiler temperature range is 150~200° C., the evaporator temperature range is 5~10° C., and the condenser temperature range is 30~40° C.

Vapor Absorption Refrigeration System (VARS)

The operating principles of Vapor Absorption Refrigeration System (VARS), also known as the Single-effect Absorption Refrigeration System compared to Vapor Compression Refrigeration Cycle (VCRC) in one sense very similar, as they both use a condenser to condense the refrigerant vapor, a throttle valve to expand and flash the refrigerant condensate into the evaporator, and the evaporator to evaporate liquid refrigerant at a low pressure producing a cold effect. However, they also differ in the sense as to how the vapor is compressed from the evaporator to the condenser. The VARS makes use of the principle that pumping a liquid between two pressures does not cost as much mechanical power as compressing a vapor between the same two pressures. Thus, in VARS a solution consists of the refrigerant and an absorbent is circulated using a mechanical pump between the low-pressure absorber and the high-pressure generator.

The generator of VARS differs in operation to a typical boiler used in VEPC-VCRS. In a boiler, the working fluid enters as a liquid stream, completely vaporizes due to boiling, and exits as a vapor stream. Whereas in the generator of VARS the refrigerant vapor is generated by boiling a mixture of refrigerant/absorbent rich in refrigerant, commonly known as the solution. As a result, a strong solution (rich in refrigerant) enters the generator, a portion of the refrigerant is vaporized from the solution due to boiling, the refrigerant vapor is expelled from the vapor outlet of the generator, and the weak solution (weak in refrigerant) exits from the solution outlet of the generator.

The refrigerant vapor which is generated in the generator condenses in the condenser. The resulting condensate flashes into the low-pressure evaporator through a throttle valve. The liquid refrigerant boils in the evaporator at a low pressure and at the refrigeration temperature, hence produces a cold-effect in the evaporator. The low-pressure vapor generated in the evaporator flows to the absorber in which the vapor is absorbed to the weak solution which flows into the absorber from the generator. In VARS the condenser and the generator operate at the same high pressure, while the absorber and the evaporator operate at the same low pressure. Despite the operating pressure difference of the condenser and the absorber, they both operate at temperatures just above the ambient temperature, as they both reject heat to the ambience. The generator is heated by an external heat source to maintain its high temperature, while the evaporator absorbs heat from the space or the body in which the cold effect to be made.

Apart from the solution circulation pump which was mentioned before, the system also consists of a solution heat exchanger, and a solution blowdown valve which also is known as the throttle valve. The solution circulation pump feeds the strong solution (rich in refrigerant) from the low-pressure absorber to the high-pressure generator and the solution heat exchanger is used to transfer heat from the hot weak solution (weak in refrigerant) which leaves the generator to the strong solution delivered by the solution pump, hence regenerating otherwise wasted heat back to the solution. The solution blowdown valve is placed downstream of the solution heat exchanger, in the absorber solution feedline through which the weak solution flows from the generator to the absorber.

The major constituents of the solution are the refrigerant and a suitable absorbent, while the other reagents may be added to enhance its thermal stability, to improve the flow and heat transfer characteristics, as well as to inhibit corrosion especially in the generator where the corrosion will be the most severe due to its high operating temperature.

The absorption process which takes place in the absorber manifests the following effects.

The weak solution absorbs the refrigerant vapor and the solution becomes enriched in refrigerant. Therefore, the solution enters the absorber as weak solution, and it leaves the absorber as strong solution.

Since the absorption phenomenon is an exothermic process, the heat is rejected to the cooling medium of the absorber.

The absorber cooling which sustains and enhances the absorption process is what causes the low pressure in the absorber. Therefore, to a high degree, the heat transfer performance of the absorber determines the performance of the absorber, hence the overall performance of the system.

The stable operation of the system is sustained on one hand by the generator which continually supplies the high-pressure refrigerant vapor to the condenser, thus providing a continuous stream of refrigerant condensate to the evaporator, on the other hand by the absorption process in the absorber which maintains a low pressure in the absorber and hence in the evaporator which is directly connected to the absorber, causing the refrigerant to boil at a low refrigeration temperature in the evaporator.

The generator and absorber pressures can be varied depending on:

The upper bound operating temperature of the generator and the lower bound operating temperature of the absorber The relative operating solution concentration range in the generator/absorber unit The way in which the vapor is conveyed from the evaporator to the absorber and/or from the generator to the condenser.

In the current state of the art, the ammonia ($NH_3$)-water and water-Lithium Bromide (LiBr) VAR systems are the extensively used where low grade or waste heat is cheaply available. A single-effect water-LiBr system, where the refrigerant is water, can be driven with 80~95° C. hot water or low-pressure steam, can provide a marginally better performance (COP in the range 0.7~0.8), although a lower-bound evaporator temperature exists around 5° C. Thus water-LiBr system finds its applications limited to air-conditioning and other sub-ambient temperature chilling operations such as wine/beverage cooling.

On the other hand, the $NH_3$-water VARS requires high temperature heating medium such as high-pressure water or steam at 100~150° C. and performs marginally lower (COP in the range 0.5~0.7), however a sub-zero temperature cooling effect, as low as −10~−20° C. can be achieved.

One advantage of the water being the refrigerant is that it has a high latent heat content. This enables one to modify the water-LiBr absorption chiller to exploit a second low-pressure generator which will be driven from the high latent heat content of the water vapor generated from a high-pressure generator, leading to the double-effect chiller design. In the double-effect water-LiBr chiller, external heating medium (in the range 100~150° C.) drives a high-pressure generator producing high-pressure water vapor, by condensing which in turn provides the heat to drive a low-pressure generator. The double-effect water-LiBr VARS performs far superior to the single-effect VARS providing a COP in the range 1.1~1.3. In the current state of the art one finds the extension of the double-effect strategy to realize a triple-effect VARS which gives a COP in the range 1.3~1.5 at a driving heat medium temperature in the range 160~200° C.

Despite the high attainable COP values, double- and triple-effect water-LiBr systems suffer from one major practical drawback which makes these systems costly to maintain, namely the severe corrosion issues experienced, especially in the high-pressure/high-temperature generator. The highly corrosive LiBr salt solution not only decays the heating tubes (mostly copper) and the generator container walls (mostly steel), the galvanic corrosion reaction mechanisms between the salt solution, and copper/steel metal substrates lead to the generation of non-condensable gasses inside the generator which eventually collect in the condenser. The collection of non-condensable gasses in the condenser eventually deteriorates the system performance unless there is a means to extract them from the condenser.
Ejector Devices The aim of this subsection is to briefly describe the working of an ejector device in the context of its usage in some of the illustrative embodiments presented in this disclosure. An ejector device can be considered as a pumping device or a low pressure creating and maintaining device. In its basic form, an ejector has a relatively simple construction with three fluid ports with no moving parts. With reference to FIG. 1(b), the inlet ports are Primary Inlet Port 60a and Secondary Inlet Port 60b, while the outlet port is the Discharge Port 60c. The main function of the device is to extract and compress the low-energy Secondary fluid which enters through the Secondary Inlet Port 60b, using the high-energy and high-momentum of the Primary fluid which enters through the Primary Inlet Port 60a, by allowing them to mix in the Mixing Chamber 64 and then increase the mixed stream's pressure by converting its kinetic energy to pressure energy as it flows through the Diffuser section 66 of the ejector. Finally, the high-pressure, low kinetic energy mixed stream exits the device through the Discharge Port 60c.

Its physics can be described as follows with reference to FIG. 1(b). High-pressure motive fluid stream enters from the Primary Port 60a into the primary nozzle 61. The motive fluid expands through the primary nozzle 61 gradually decreasing its pressure and accelerates increasing its velocity, hence increasing the kinetic energy and the momentum of the primary stream 62. The motive fluid stream 62 leaves the primary nozzle exit at a state of high kinetic energy and momentum, and in the mixing-chamber 64 meets the low-pressure secondary fluid stream 63 which enters the ejector through the Secondary port 60b. In the mixing chamber 64 both fluid streams mix and flow unidirectionally, while the secondary stream 63 accelerates and the primary motive stream 62 decelerates due to the exchange of kinetic energy and momentum between the two streams. Depending on the ejector mixing chamber design, the mixed stream enters the throat 65 with a reasonably high kinetic energy and then enters the diffuser section 66 of the flow passage. In the diffuser the mixed stream decelerates increasing the stream pressure and eventually leaves the diffuser at an intermediate pressure compared to the high motive pressure and the low suction pressure.

Depending on the physical state of the primary fluid at the entrance to the primary nozzle 60a whether it is a liquid or vapor and whether the accelerated stream at the exit of the primary nozzle 61 is in the subsonic or the supersonic, the primary nozzle could be a convergent type or a convergent-divergent type nozzle. For example, if the primary fluid is a liquid, since liquids never accelerates beyond subsonic regime, the primary nozzle is always a convergent type for a liquid. However, if the primary stream fluid physical state is vapor, since a vapor can accelerate to subsonic or supersonic regime, the primary nozzle could be either a convergent type or a convergent-divergent type.

The ejector is said to be a two-phase ejector, when either the primary stream is a liquid and the secondary stream is a vapor or vice-versa. In a two-phase ejector the fluid flow characteristics inside the ejector markedly differ depending on whether the vapor condenses inside the ejector.

The ejector can be designed to pump a given secondary stream of fluid at given rate using a high-pressure primary (motive) stream of fluid. It also can be designed to maintain a given-low pressure in the chamber (not shown in FIG. 1(b)) which is connected to the secondary port.

BRIEF DESCRIPTION OF THE FIGURES

The following diagrams are included in this disclosure:

FIG. 1(a)-i is a partial schematic diagram illustrating a two stage throttling option for Illustrative Embodiment 1.

FIG. 1(a)-ii is a partial schematic diagram illustrating an electric drive to transfer power from the expanders to the compressors, and to utilize the excess power generated through an electric network or a battery.

FIG. 1(b) is a schematic diagram of an Ejector Device.

FIG. 2(b)-i is a partial schematic diagram illustrating a separate expansion stage option for Illustrative Embodiment 3.

FIG. 2(c) is a schematic diagram of an Illustrative Embodiment 4 of the invention.

DETAILED DESCRIPTION OF EMBODIMENTS

Figure 1A:
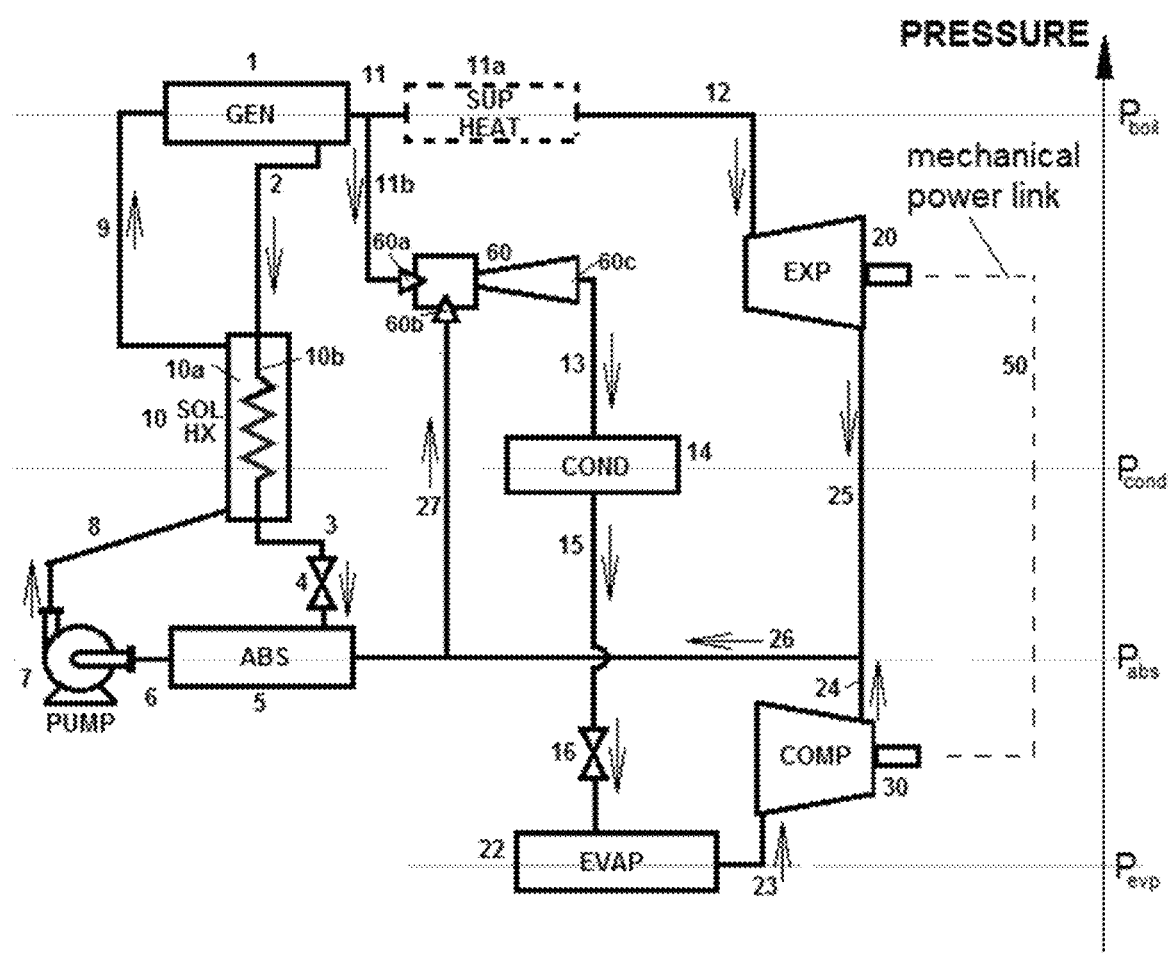
FIG. 1(a) is a schematic diagram of an Illustrative Embodiment 1 of the invention.

This disclosure describes a way in which a single-effect vapor absorption refrigeration/heat-pump system (VARS) can be combined with the components of a conventional vapor compression refrigeration cycle (VCRC) driven by a vapor expansion power cycle (VEPC) system leading to a high-performance refrigeration system.

The concepts introduced in this disclosure will apply to any VARS, provided that the generator vapor output contains only the refrigerant but none of the absorbent, thus eliminating the need of a rectifier. For example, systems where a refrigerant and a salt is used as the solution, such as (water+LiBr), (ammonia+LiNO$_3$), (ammonia+NaSCN), or a refrigerant and an ionic liquid is used are ideal candidates for adoption. On the other hand, a VARS using a working fluid such as (ammonia+water) would not be suitable, because when the ammonia/water mixture boils in the generator, the generated vapor, although mostly ammonia will contain some water vapor.

The embodiments presented in the following sections teach how to implement a number of refrigeration/heat-pump systems based on the principles laid down in the section titled Background. These novel refrigeration/heat-pump concepts incorporate a single-effect vapor absorption unit with at least one expander and at least one compressor which work as a combined VEPC-VCRS.

The embodiments presented in this disclosure are meant to achieve two main objectives, namely:

To achieve a heat-driven, refrigerator, chiller, and/or a heat-pump system which consists of mechanically coupled expander-compressor combination in which the power requirement of the compressor is fully supplied by the expander, a vapor generator/absorber unit, a superheater, a condenser, an evaporator to produce a cold-effect, a supplementary refrigeration loop between the evaporator and the condenser to which there is no direct expense of heat from the generator, and provides a COP equivalent to the double-effect water-LiBr absorption system; and To achieve a heat-driven, refrigerator, chiller, and/or a heat-pump system which consists of mechanically coupled expander-compressor combination in which the power requirement of the compressor is fully supplied by the expander, a boiler/superheater which runs on a non-corrosive working fluid to feed the expander, a high-pressure condenser in the boiler/expander circuit to provide heat to drive the vapor generator/absorber unit, a low-pressure condenser connected to the vapor generator, an evaporator to produce a cold-effect, a supplementary refrigeration loop between the evaporator and the condenser to which there is no direct expense of heat from the generator, and provides a COP equivalent to the triple-effect water-LiBr absorption system.

ILLUSTRATIVE EMBODIMENTS

In this section, the ways in which the chiller/refrigeration/heat-pump can be implemented are explored. The following sections describe the illustrative embodiments of the system.

In the descriptions of the embodiments which follow, the detailed descriptions of individual components as to how they operate is not presented. This is because the background given above covered those aspects of individual components. For example, condensers and absorbers typically operate at temperatures just above the ambient temperature rejecting heat to the ambience; a temperature of 10° C. above the ambient temperature is a highly practical approximation. The boilers, superheaters, and generators operate at high pressure and high temperature expelling the vaporized working fluid; the temperature range of 100~200° C. is typical for these components. The evaporators operate at the desired refrigeration temperature producing a cold effect; temperatures in the range 5~10° C. for air conditioning and −20~0° C. for refrigeration and heat-pump applications are typical.

It is a highly practical assumption that thermodynamic processes in generators, boilers, absorbers, condensers, and evaporators, although are flow-processes, take place at isobaric conditions at their individual pressures without a significant pressure drops along the flow passages in the components. The only components which manifest significant pressure drops are expanders, compressors, and throttle (or blowdown) valves. In the schematic diagrams provided the flow lines are represented in a single line between various components; it is assumed that the pressure losses along these flow lines are also negligible.

In the descriptions of the embodiments which follow, the compressor stages are considered to be driven by the mechanical power produced by the expander stages, and in the description this aspect is depicted by a mechanical power link between the compressors and the expanders. In reality this link could take many forms such as a single-shaft mounted machines, the multi-shaft mounted machines coupled through gear-trains or fluidic-drives. As shown in FIG. 1(a)-ii, it also could be an electric drive where the expander stages drive an electric power generator, and resulting electric power drives the electric motors which in turn drive the compressor stages. In this scenario it is also possible that the electric generator provides electric power in excess of the power consumption of all the motors and the excess electric power is fed to an electric power system such as the power-grid or to an electric power storage device such as a battery-bank.

In reference to the generator/absorber unit the term strong solution means the solution which has a relatively higher concentration of refrigerant (i.e., highly concentrated in refrigerant), while the term weak solution means the solution which has a relatively lower concentration of refrigerant (i.e., a low concentration of refrigerant). For example, for (water+LiBr) absorption unit the weak solution typically has a lower limit of 38% water by weight to avoid crystallization and the strong solution is limited to about 45% water by weight which is determined by the absorption capacity of the absorber. On similar rationale, for (ammonia+$LiNO_3$) absorption unit could practically operate in the concentration range of 30% to 45% of ammonia by weight, while for (ammonia+NaSCN) absorption unit the range will be 35% and 45% of ammonia by weight. It should be highlighted here that the percent values given here are referred to the refrigerant concentration in the solution, where as it is customary in the literature to give the solution concentration in terms of salt concentration. Thus 45% of refrigerant in a solution is equivalent having 55% of salt in the solution.

Illustrative Embodiment 1

The embodiment of a hybrid system where a VEPC-VCRC and Vapor Absorption cycles are combined is shown in FIG. 1(a). In this embodiment, the absorber operates at a pressure above the evaporator pressure but below the condenser pressure, and a compressor stage is used to convey refrigerant vapor from the low-pressure evaporator to the relative higher-pressure absorber. Further, to meet the compressor power requirement an expander is employed to operate between the generator and the absorber, while the generator now operates at a higher pressure than that of the condenser compared to a conventional VARS. Therefore, the expander is supplied with the high pressure/high temperature vapor from a generator, while the low-pressure vapor which exits the evaporator is compressed and fed to the absorber instead of being condensed in a condenser. As a result, the expander in this embodiment operates with a greater pressure ratio compared to an expander that operates in a conventional VEPC, while the compressor in this embodiment operates in a lower pressure ratio compared to a compressor that operates in a conventional VCRC. The net advantage is that, due to the mechanical power balance between the compressor and the expander, the mass flow rate ratio in the compressor with respect to the expander is increased.

In order to complete this embodiment, the refrigerant vapor is fed to the condenser directly from the generator outlet, but before the optional superheater. In doing so, however, one increases the heat consumption in the generator to produce this extra vapor stream which passes through the condenser.

Since the generator operates at a higher pressure than that of the condenser, a throttle valve may be employed to bring the pressure of the vapor stream down to the condenser pressure. However, such a throttling process would introduce a form of thermodynamic exergy degradation to the system, thus introducing an associated overall performance degradation of the system. A more profitable way to accomplish the same objective is to insert an ejector device instead of a simple throttle valve. An ejector would not only act as an expansion valve, but it also pulls a secondary vapor stream from a suitable point in the system to the condenser. Thus, the advantages of using an ejector are twofold:

1. The secondary stream of the ejector will not consume any external heat from the generator, as it does not pass through the generator,
2. The refrigerant vapor stream which flows into the condenser is compounded by the secondary stream and the primary stream of the ejector, hence reducing the energy cost of production of the condensate which determines the cold effect in the evaporator.

Thus, the use of an ejector instead of a throttle valve improves the overall performance of the system.

With reference to FIG. 1(a) the working of the embodiment can be described as follows. The solution circulation pump 7 of the absorber/generator unit raises the pressure of the strong solution in the absorber and delivers to the generator through the pump suction line 6, through the pump delivery line 8, through the cold side of the heat exchanger 10a in which the strong solution absorbs heat from the hot-side 10b, and then through the generator solution feedline 9. The strong solution is heated in the generator 1 and the portion of the refrigerant is vaporized and expelled through the generator vapor outlet 11. As the solution boils, the solution temperature increases while it becomes weaker in refrigerant. Thus, the hot weak solution leaves the generator through the solution outlet line 2. In order to increase the energy efficiency, the hot weak solution passes through the hot-side 10b of the heat exchanger 10 delivering heat to the cold-side 10a, hence regenerates heat that otherwise would be dissipated in the absorber 5. The weak solution then blows down to the absorber 5 through the throttle valve 4 in the absorber solution feedline 3 and commences absorbing the refrigerant vapor hence enriching itself in refrigerant to form the strong solution. The strong solution formed in the absorber then is pumped to the generator, so repeats the solution cycle.

The generator expels high pressure, high temperature vapor through the vapor outlet line 11. This vapor stream is divided into two streams, and one flows to the primary port 60a of the ejector 60 through the ejector primary feedline 11b while the other stream flows to the expander 20, through the optional superheater 11a and then through the expander inlet line 12. In the expander, the vapor expands producing mechanical power which will be delivered through the expander shaft. The expanded vapor, now at the absorber pressure, leaves the expander through the expander outlet line 25.

The high pressure, high temperature stream which enters the ejector 60 through the ejector primary port 60a, expands through the ejector primary nozzle to a low pressure while the stream velocity increases to a very high level. The high-speed primary stream entrains the secondary stream which enters from the ejector secondary port 60b, and the two streams mix in the ejector mixing chamber while the momentum and the energy transfer takes place between the streams. The resulting mixed stream, now at an intermediate high velocity, passes through the diffuser section of the ejector where it decelerates, and the pressure increases. Finally, the mixed stream leaves the ejector through its delivery port 60c at the condenser pressure and enters the condenser through the condenser feedline 13. As FIG. 1(a) shows the ejector secondary stream 27 is extracted from the absorber vapor feedline 26 thereby somewhat reducing the absorber duty.

In the condenser 14, the vapor condenses by rejecting heat to the ambience, and the resulting condensate flows through the evaporator feedline 15 and flashes into the evaporator 22 which is at a low pressure, through the throttle valve 16. Another option would be to incorporate two stage throttling as shown in FIG. 1(a)-i. In this case the throttling can be done in two stages with a liquid-vapor separator 17 placed in between; first throttling stage 16 from the condenser pressure to the absorber pressure, and a second throttling stage 21 from the absorber pressure to the evaporator pressure. However, two-stage throttling also requires a liquid-vapor separator 17 to be placed at the absorber pressure allowing the flashed vapor generated in the first throttling stage to escape to the absorber through a vapor bypass line 18.

In the evaporator, the liquid refrigerant evaporates creating a cold effect and the resulting vapor flows out of the evaporator through the compressor vapor feedline 23. In the compressor 30, the vapor is compressed to the absorber pressure, and the compressed vapor is delivered to the compressor outlet line 24. The two streams of vapor 24 and 25, both at the absorber pressure, mix and flow toward the absorber 5 through the absorber vapor feedline 26.

As shown schematically in FIG. 1(a), a mechanical power link 50 between the expander and the compressor shafts ensures that the total power consumption of the compressor and all mechanical shaft losses are provided by the expander power output.

It should be emphasized that there is no expense of generator heat to the secondary vapor stream 27 of the ejector which passes through the condenser and the evaporator supplementing the cold effect of the evaporator.

Illustrative Embodiment 2

Figure 2A:
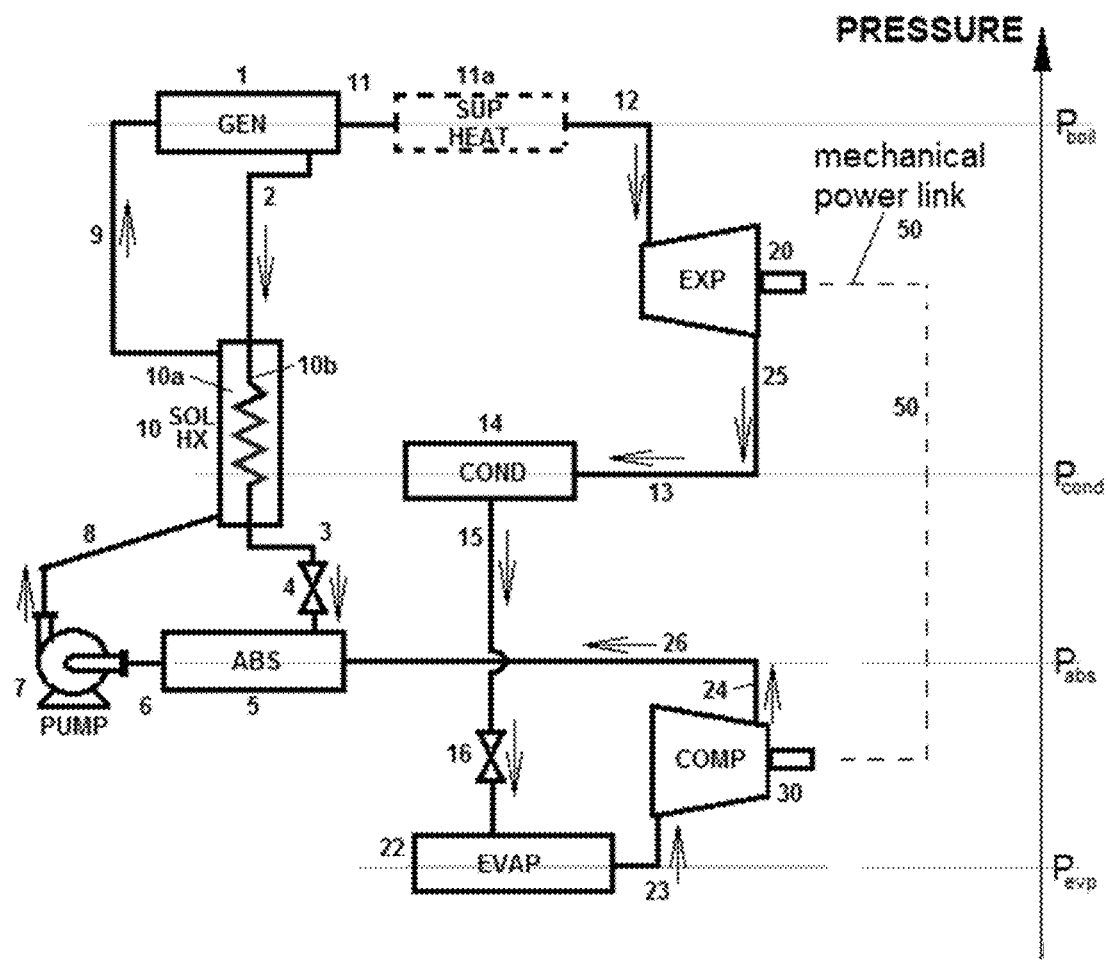
FIG. 2(a) is a schematic diagram of an Illustrative Embodiment 2 of the invention.

Another embodiment of the system is shown in FIG. 2(a). In this embodiment, the condenser is fed with the low-pressure vapor which is expelled from the expander. Thus, the expander operates between the high generator pressure and the condenser pressure, as a result it operates within a lower pressure ratio than the Embodiment 1 described above. Nevertheless, there is still an advantage due to the low-pressure ratio within which the compressor operates, namely between the evaporator pressure and the absorber pressure. Another advantage of this embodiment is that there are no other vapor streams supplied by the generator, such as the stream fed to the primary port of the ejector in the embodiment 1 shown in FIG. 1(a).

The working of this embodiment can be described with reference to FIG. 2(a) as follows. A solution of a suitable refrigerant and an absorbent is circulated in the generator/absorber unit, thus the refrigerant in the solution is the working fluid of the VEPC. The strong solution which is collected in the absorber 5 is delivered by the pump 7 to the generator 1 through the pump suction line 6, through the pump delivery line 8, through the cold-side of the solution heat exchanger 10a, and then through the generator solution feedline 9. In the generator 1, the strong solution is heated and a portion of the refrigerant constituent in the solution is vaporized and expelled through the generator vapor outlet line 11. The resulting hot weak solution flows from the generator 1 to the absorber 5 through the solution outlet line 2, through the hot-side of the solution heat exchanger 10b, through the blowdown valve inlet line 3, and then through the solution blowdown valve 4. The heat exchanger 10 enhances the performance of the generator/absorber unit as it regenerates the heat from the hot-side of the heat exchanger 10b to the cold-side of the heat exchanger 10a, thus reducing the heat duty of the generator as well as of the absorber. The solution completes its cycle by entering the absorber 5 and absorbing the vapor which enters the absorber through the absorber vapor feedline 26, thus enriching itself with the refrigerant to make the strong solution which collects in the absorber 5.

Figure 2B:
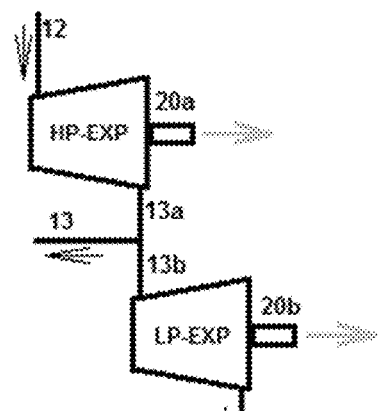
FIG. 2(b) is a schematic diagram of an Illustrative Embodiment 3 of the invention.
Figure 2B:
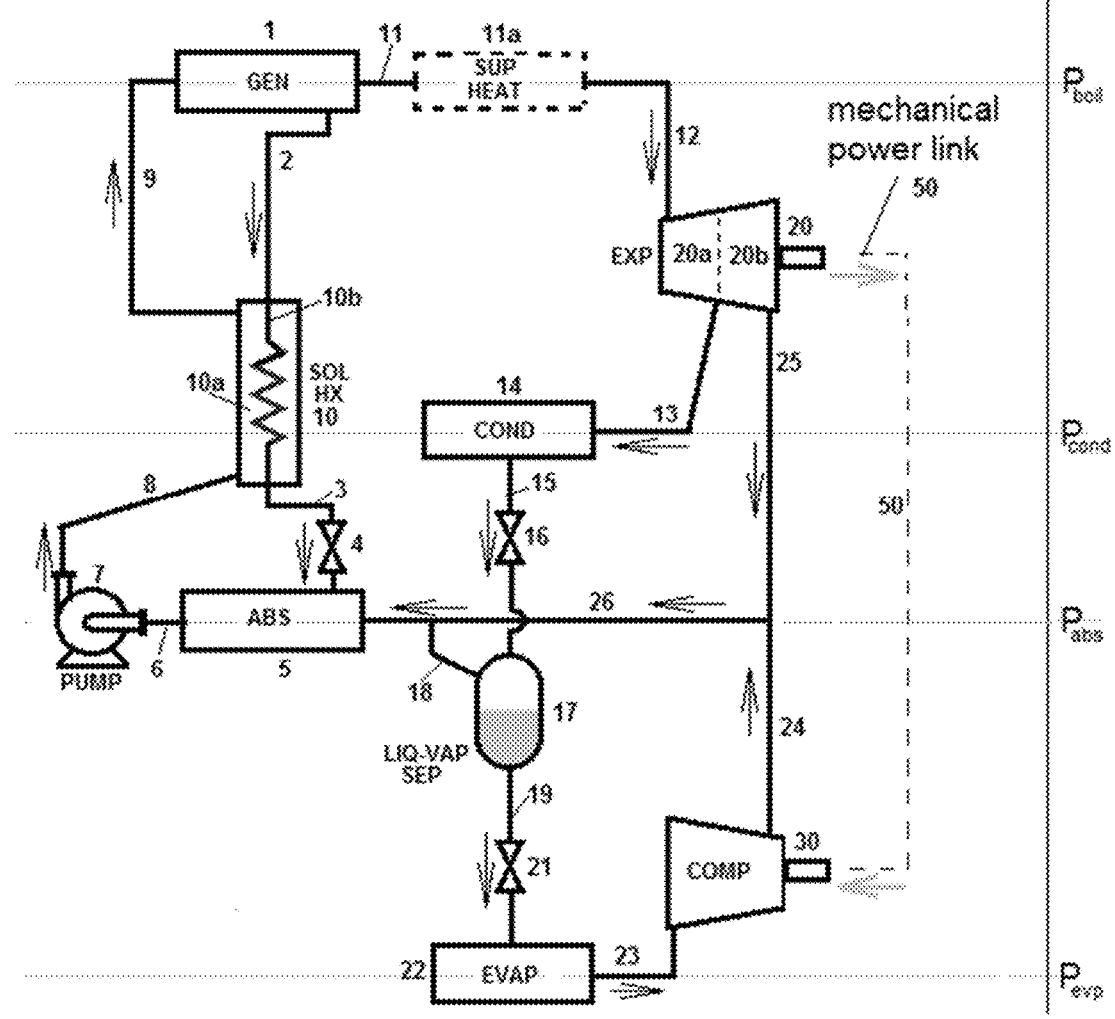

The high pressure, high temperature vapor expelled from the generator 1 flows through the generator vapor outlet line 11 and then through the optional superheater 11a and enters the expander through the expander vapor inlet line 12. In the expander 20 the high-pressure vapor expands while the expander shaft delivers the mechanical power harnessed from the expanding vapor. The expanded vapor, now at a pressure close to the condenser pressure exits the expander through the expander vapor outlet line 25 and enters the condenser 14 through the condenser feedline 13. In the condenser, the vapor condenses rejecting heat to the ambience, and the resulting condensate exits the condenser 14 through the evaporator feedline 15. As shown in FIG. 2(a), the condensate expands through the throttle valve 16, and the condensate flashes into the evaporator 22 as a cold liquid. Although, not shown in FIG. 2(a), the condensate expansion and flashing could be staged to occur in two stages as shown in FIG. 2(b) or (c), in which case a liquid/vapor separator (17 as shown in FIG. 2(b)) is needed with a vapor bypass line (18 as shown in FIG. 2(b)).

The cold liquid refrigerant which flashes into the evaporator 22, evaporates creating a cold effect in the evaporator. The evaporated vapor exits the evaporator through the compressor feedline 23 and flows into the compressor. The compressor 30 compresses the cold vapor from the evaporator pressure to the absorber pressure and delivers to the absorber vapor feedline 26 through the compressor outlet line 24. Eventually, the compressed vapor, now at the absorber pressure, flows to the absorber 5.

As shown schematically in FIG. 2(a), a mechanical power link 50 between the expander and the compressor shafts ensures that the total power consumption of the compressor and all mechanical shaft losses are provided by the expander power output.

In this embodiment, the absorber/generator unit operates exactly as explained in reference to the operation of a single-effect vapor absorption refrigeration system in the section titled Background.

Illustrative Embodiment 3

FIG. 2(b) shows one form of the illustrative embodiments of the refrigeration system. The system comprises of two major subsystems; the combined VEPC driven VCRC unit which includes the mechanically coupled expander and the compressor, and the refrigerant vapor generator/absorber unit which operates cycling a refrigerant/absorbent solution between the absorber and the generator. The generator which operates at a high pressure to supply the hot, high-pressure vapor, acts as the boiler to the VEPC-VCRC subsystem. The absorber, which operates at a low pressure, which is lower than that of a traditional condenser, acts as the vapor condenser to the VEPC-VCRC subsystem. The VEPC-VCRC subsystem uses only the refrigerant, on the other hand the generator/absorber unit operates with the refrigerant as well as the refrigerant/absorbent solution.

To operate the system the generator is heated with a suitable heating medium. The condenser and the absorber are cooled to remove the rejected heat by the working fluid therefore they operate at temperatures somewhat close to but slightly above the ambient temperature. The evaporator operates at the refrigeration temperature.

The working of the system can be described with reference to the FIG. 2(b) as follows. The generator 1 is fed with the high-pressure, strong solution from the generator solution feedline 9. The solution in the generator 1 is heated with an external heat source, thus the solution boils vaporizing a portion of the refrigerant constituent in the solution, leaving the absorbent completely in the solution, hence there is no absorbent constituent in the vapor expelled from the generator. The solution temperature increases while boiling, however the generator pressure remains constant. The solution that exits the generator will be higher in temperature than the solution temperature at the generator inlet, although it will be weaker in refrigerant constituent.

The hot, weak solution which exits the generator through the generator solution outlet 2 passes through the hot-side of the heat exchanger 10b, rejecting heat to the cold-side of the heat exchanger 10a. When the weak solution exits the heat exchanger through hot-side outlet 3 it will be somewhat low in temperature, as it has regenerated the heat to the strong solution which flows in the cold-side of the heat exchanger 10a. Eventually, the weak solution enters the absorber 5 through the solution throttle valve 4. In the absorber, the warm weak solution meets the refrigerant vapor which flows into the absorber through the absorber vapor feedline 26, and the weak solution absorbs the vapor, enriching itself in refrigerant. Eventually, so formed strong solution exits the absorber 5 through the pump suction line 6 and is delivered to the generator pressure by the solution feed pump 7 through the cold-side inlet line 8 of the heat exchanger 10. The strong solution which flows through the cold-side 10a of the heat exchanger is heated from the heat rejected by the weak solution which flows in the hot-side 10b of the heat exchanger, and eventually flows into the generator through the generator solution feedline 9.

The refrigerant vapor exits the generator through the generator vapor outlet line 11, and passes through the optional superheater 11a, then enters the vapor expander 20. The expander, as depicted in FIG. 2(b) could be a single unit with a bleed-port placed appropriately in the mid-section corresponding to the condensation pressure to extract vapor out of the expander. It also could be a combination of two separate expansion stages as shown in FIG. 2(b)-i.

As a result, the total incoming vapor to the expander through the expander inlet line 12 expands from the generator pressure to the condenser pressure in the high-pressure portion of the expander 20a, while only a lesser portion of the total vapor input expands further from the condenser pressure to the absorber pressure in the low-pressure portion of the expander 20b. This is because a portion of the total refrigerant input to the expander is bled through the condenser feedline 13.

FIG. 2(b)-i shows the two-stage expander scenario of the embodiment. Here vapor output of the high-pressure expansion stage 13a is split into two streams 13 and 13b. The stream 13 flows to the condenser 14, while the stream 13b is fed to the low-pressure expansion stage 20b.

In the condenser 14, the refrigerant vapor which enters through the feedline 13 condenses rejecting heat to the condenser cooling medium, and the resulting condensate flows through the throttle valves 16 and 21 and flashes into the evaporator 22. As depicted in FIG. 2(b), the refrigerant flashing occurs in two stages to improve the system performance. First the condensate expands from the condenser pressure to the absorber pressure through the high-pressure throttle valve 16 in the condenser outlet line 15. The resulting flashed refrigerant passes through a liquid-vapor separator 17, where the flashed vapor is allowed to escape through the vapor bypass line 18 to the absorber vapor feedline 26 and eventually flows to the absorber 5. The separated liquid in the liquid-vapor separator 17 expands from the absorber pressure to the evaporator pressure through the second, low-pressure throttle valve 21 in the evaporator vapor feedline 19. The capillary lines may be used instead of the expansion valves.

The flashed refrigerant which is mostly cold liquid, enters the evaporator 22 through the low-pressure stage throttle valve 21 and evaporates at a low pressure hence producing a cold effect in the evaporator 22. The low-pressure vaporized refrigerant flows from the evaporator 22 to the compressor 30 through the compressor vapor feedline 23. In the compressor 30 the refrigerant vapor is compressed from the evaporator pressure to the absorber pressure. Eventually the compressed vapor which flows through the compressor outlet line 24, mixes with the vapor which flows from the low pressure expander stage 20b through the expander outlet line 25 and the mixed stream of vapor flows to the absorber through the absorber vapor feedline 26.

The shafts of the expander and the compressor are mechanically coupled through a mechanical power link 50, so that the total power requirement of the compressor and all shaft mechanical power losses are met solely by the power output of the expander.

Illustrative Embodiment 4

Figure 2C:
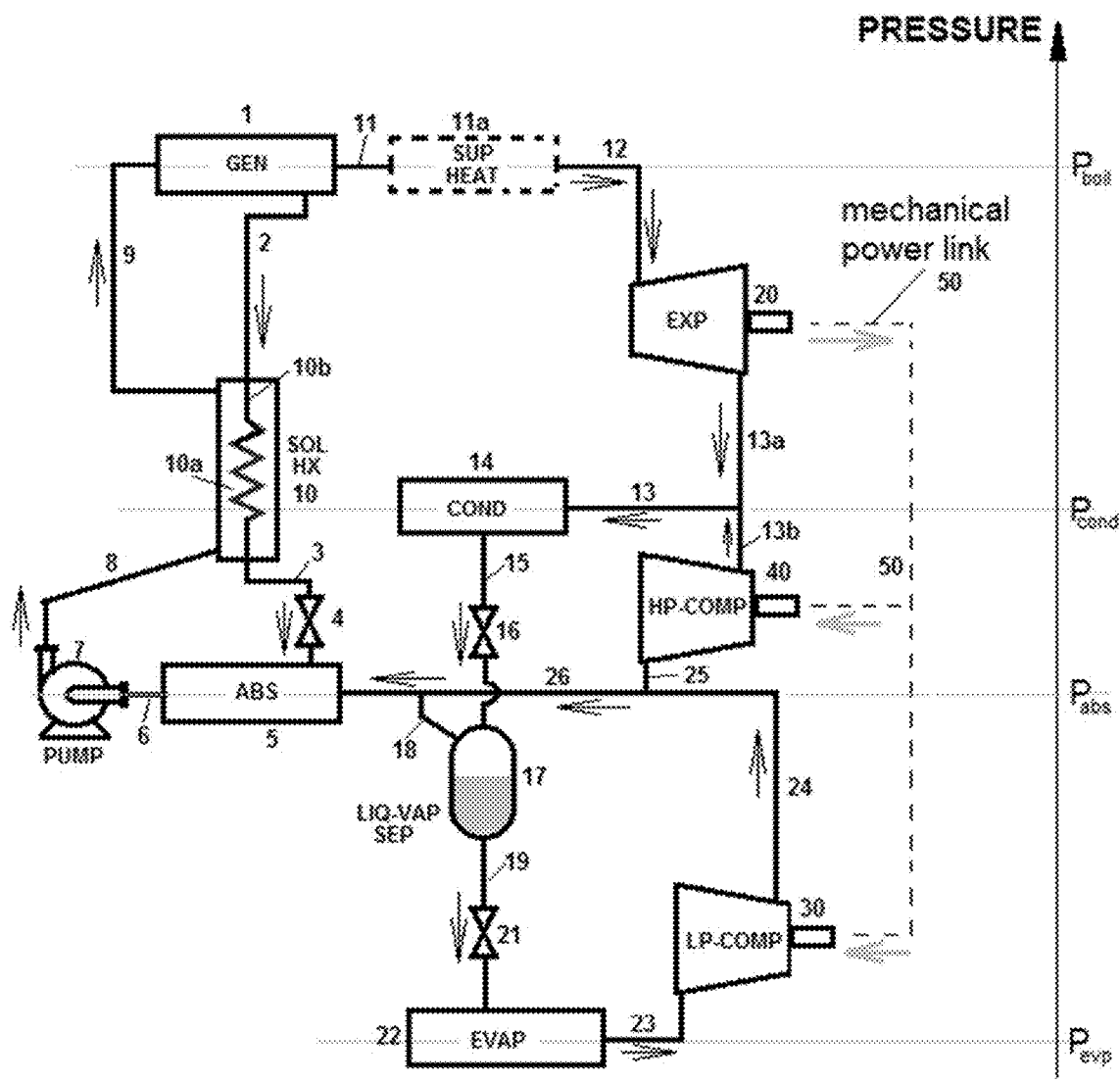

FIG. 2(c) shows another illustrative embodiment for the system. This embodiment, for the most part, resembles the system shown in FIG. 2(b), except for a single significant modification, namely that the second expansion stage [20b in FIG. 2(b)] is replaced with a second, high-pressure compressor stage [40 in FIG. 2(c)].

The generator/absorber unit in this system operates exactly as described referring to the Embodiment 3 in FIG. 2(b). However, the generator of this embodiment shown in FIG. 2(c) operates at a higher pressure (hence at a higher temperature) than that of the Embodiment 3 shown in FIG. 2(b). The refrigerant vapor which exits the generator 1 through the generator vapor outlet line 11, and passes through the optional superheater 11a, enters the vapor expander 20. In this embodiment, there is only a single expander stage 20, in which the refrigerant vapor expands from the generator pressure to the condenser pressure. Since the generator operates at a much higher pressure than that of the Embodiment 3 shown in FIG. 2(b), in this embodiment the expander produces more mechanical power than the power consumption of the compressor 30. As a result, it opens the possibility of employing a second high-pressure compression stage 40 to be driven by the extra power produced by the expander 20.

As shown in FIG. 2(c), the second high-pressure compressor stage 40 can be placed in the system to pull a portion of the refrigerant vapor from the outlet of the low-pressure compressor stage and is compressed and delivered to the condenser pressure.

The working of the system shown in FIG. 2(c) can be described as follows. High pressure/high temperature vapor which enters the expander 20 through the expander feedline 12, expands to the condenser pressure and exits the expander 20 through the expander outlet line 13a. This outlet stream of vapor mixed with the vapor which exits from the second stage high-pressure compressor stage 40 through its outlet line 13b flows to the condenser 14 through the condenser feedline 13.

The shafts of the expander and the compressors are mechanically coupled through a mechanical power link 50, so that the total power requirement of the compressors and all shaft power loses are met by the power output of the expander.

In the condenser 14, the mixed stream of refrigerant vapor condenses rejecting heat to the condenser cooling medium. The resulting condensate flows through the throttle valves 16 and 21 and flashes into the evaporator 22. As depicted in FIG. 2(c), the condensate flashing occurs in two stages to improve the system performance. First the vapor expands from the condenser pressure to the absorber pressure through the high-pressure throttle valve 16 in the condenser outlet line 15. The resulting flashed refrigerant passes through a liquid-vapor separator 17, where the flashed vapor is allowed to escape through the vapor bypass line 18 to the absorber vapor feedline 26 and eventually flows to the absorber 5. The separated liquid in the separator 17 further expands from the absorber pressure to the evaporator pressure through the second, low-pressure throttle valve 21 in the evaporator feedline 19.

The flashed refrigerant which is mostly liquid, enters the evaporator 22 through the evaporator feedline 19 and evaporates at a low pressure in the evaporator 22 hence producing a cold effect in the evaporator. The low-pressure vaporized refrigerant flows to the low-pressure compressor stage 30 through the compressor feedline 23. In the compressor 30 the refrigerant vapor is compressed from the evaporator pressure to the absorber pressure. The compressed vapor flows through the compressor outlet line 24, then splits into two streams; one stream flows through the absorber feedline 26 and the other through the high-pressure compressor stage feedline 25. The vapor stream which flows through the high-pressure compressor stage feedline 25 will be compressed to the condenser pressure by the high-pressure compressor stage. This compressor outlet stream 13b then mixes with the vapor stream that flows in the expander outlet line 13a, and the mixed stream eventually flows to the condenser, through the condenser inlet line 13.

In this embodiment the generator/absorber unit which comprises of the generator 1, the heat exchanger 10, the solution blowdown valve 4, the absorber 5, the solution pump 7, and the solution flow paths 2, 3, 6, 8, 9, 10a, 10b operates exactly as explained with reference to the Embodiment 3.

As shown schematically in FIG. 2(c), a mechanical power link 50 between the expander and the compressors ensures that the total power consumption of the compressor and all mechanical shaft losses are provided by the expander power output.

It should be highlighted that the refrigerant stream that flows through the high-pressure compressor stage 40 supplements the cold effect produced in the evaporator, to which the generator/absorber pair has no direct dependence, as this vapor stream does not flow through the generator/absorber unit. Thus, there is no direct generator heat expense associated with the production of this stream of refrigerant.

Interestingly, it can be shown that there exists a generator pressure relationship for the systems shown in FIGS. 2(*a*), 2(*b*), and 2(*c*). For example, consider the case that the system shown in FIG. 2(*b*) operates for a given refrigerant/absorbent pair, for a set of fixed values of evaporator, absorber, and condenser pressures, and an appropriate generator pressure. In this situation, the two expansion stages (20*a* and 20*b*) collectively provides the power requirement of the compressor 30. Suppose the generator pressure is now raised, holding the condenser, absorber, and the evaporator pressures at their fixed values, it can be shown that the power output of the high-pressure expander stage increases while the power output of the low-pressure expander stage decreases, maintaining the power balance between the expander stages and the compressor. In continually doing so, one arrives at a situation that the power output of the high-pressure expander stage meets the power requirement of the compressor, thereby diminishing the power output of the low-pressure expander stage to zero—thus achieving the embodiment shown in FIG. 2(*a*) where there is no low-pressure expander stage. Further increase of the generator pressure leads to the scenario that the only expander stage which operates between the generator pressure and the condenser pressure produces more power than the power consumed by the only compressor operating between the evaporator pressure and the absorber pressure, thus presenting the possibility of inserting a second compressor stage to be driven by the excessive power produced by the expander, thus arriving at the embodiment shown in FIG. 2(*c*). The system performance estimates carried out by realistic simulations indicate that the embodiment shown in FIG. 2(*c*) can perform at a higher COP than the embodiment shown in FIG. 2(*b*).

Illustrative Embodiment 5

As mentioned before one major drawback of a high-temperature generator, especially when salt solutions of the refrigerant are used as the absorbents, is the potentially severe corrosion problems in the high-temperature generator. This embodiment is specifically aimed to improve the performance of the single-effect absorption system by virtually eliminating the high-temperature generator, hence eliminating the severe corrosion problems which decays the generator container walls and the heat transfer surfaces. In doing so, the new design attempts to achieve COP values which are comparable to the COP of triple-effect LiBr systems.

Figure 3:
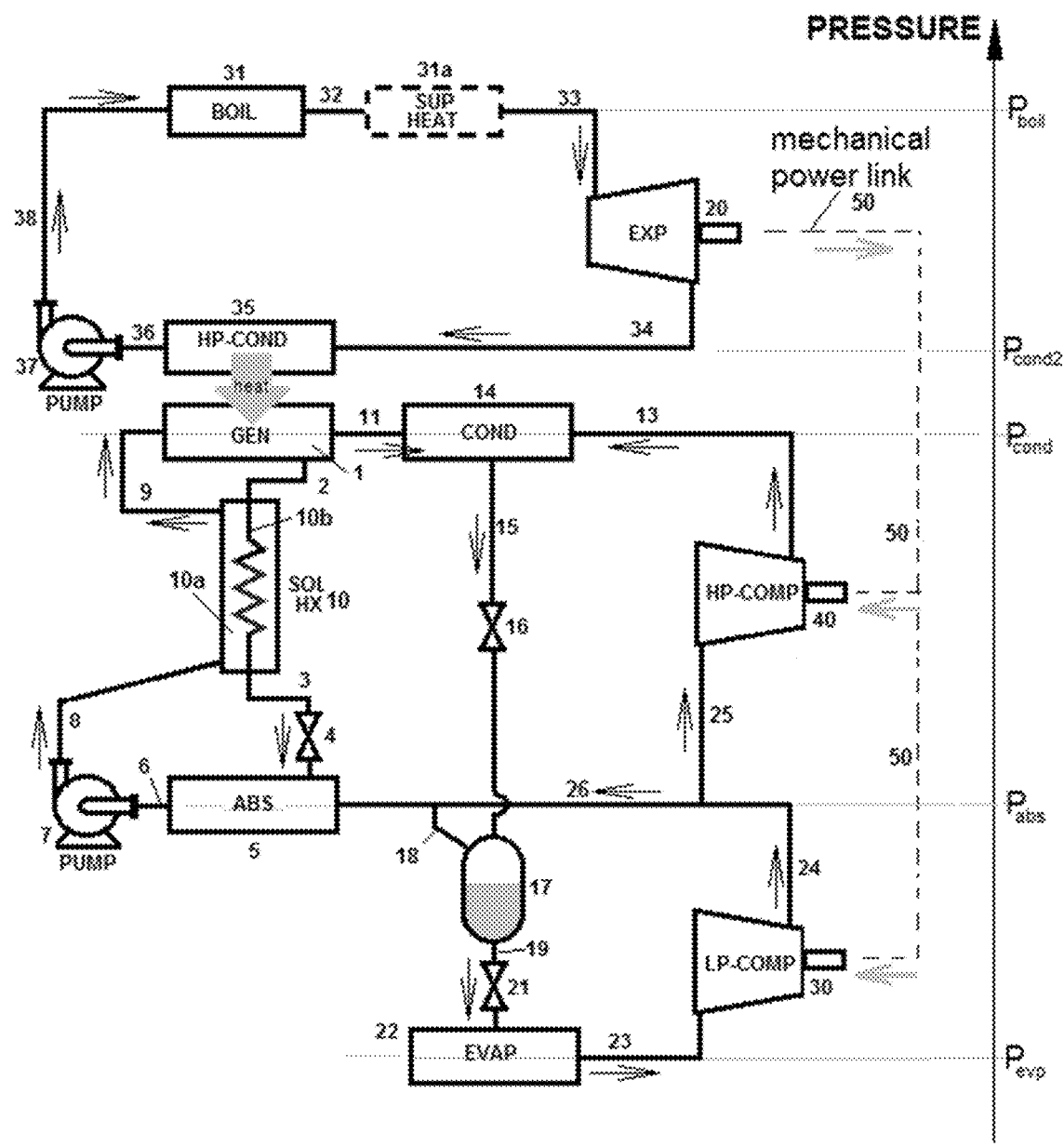
FIG. 3 is a schematic diagram of an Illustrative Embodiment 5 of the invention.

The major feature which distinguishes this embodiment from the previously described embodiments is that this embodiment consists of a separate VEPC subsystem in addition to the generator/absorber unit, and a condenser/evaporator subsystem with a supplementary refrigerant compression loop which contains the high-pressure compressor stage (see FIG. 3).

The boiler (BOIL) and the optional superheater (SUPHEAT) operate at a high pressure/temperature comparable to the high pressure/temperature at which the generator of the previous embodiments operates. The condenser (HP-COND) of the VEPC subsystem operates at somewhat higher pressure so that the corresponding condensation temperature is higher than the generator temperature, enabling heat transfer from the VEPC condenser (HP-COND) to the generator (GEN). The design of the system is such that the generator heat requirement is fully met by the VEPC condenser (HP-COND). As a result, it is apparent that the heat input to the VEPC subsystem is used at 100% efficiency due to the regeneration taking place in the VEPC condenser (HP-COND).

Another advantage of this embodiment is that it opens the provision of selecting the working fluid of the VEPC subsystem quite independently to the rest of the system. A less corrosive pure working fluid or a mixture of several working fluids can be used.

The working of this illustrative embodiment shown in FIG. 3 can be described as follows. The VEPC subsystem contains a boiler 31, an optional superheater 31*a*, an expander 20, a high-pressure condenser 35, and a liquid feed pump 37. The feed pump 37 delivers the working fluid in the liquid phase to the boiler 31. The boiler 31, which operates at a high pressure, is heated by a high-temperature external heat source and the working fluid is boiled and vaporized. The vaporized high-temperature/high-pressure working fluid flows through the boiler outlet line 32 towards the expander 20. An optional superheater 31*a* may be used to further increase the temperature of the vaporized working fluid. The high-pressure/high-temperature working-fluid vapor enters the expander 20 through the expander vapor feedline 33 and the working fluid expands from the boiler pressure to the VEPC condenser pressure. The expanded vapor, now at the VEPC condenser pressure, exits the expander through the expander outlet line 34 and flows to the VEPC condenser 35.

The VEPC condenser 35 which in turn rejects the heat to the generator 1 of the absorber/generator unit, operates at a relatively higher pressure so that the condensation temperature is somewhat higher than the generator operating temperature. This is an essential condition to fulfill if all the rejected heat in the VEPC condenser is to be transferred to the generator to boil the solution. Thus, the strong solution which enters the generator is heated by the heat rejected by the VEPC condenser, as a result a portion of the refrigerant in the solution is vaporized and expelled from the generator 1. The condensate produced in the VEPC condenser 35 is eventually pumped back to the boiler 31 through the boiler feed pump suction line 36 and the boiler feedline 38, thus completing the VEPC cycle.

The generator/absorber subsystem in this embodiment operates exactly as described before referring to the embodiments shown in FIGS. 2(*a*), (*b*), and (*c*), except for:

1. The generator 1 operates at the pressure that nearly equals to the pressure of the condenser 14; and
  2. The generator extracts regenerative heat from the VEPC condenser 35 that boils away the refrigerant vapor from the solution.

Refrigerant vapor expelled from the generator 1 flows to the low-pressure condenser 14 through the generator outlet line 11. In the condenser 14 the refrigerant vapor flowing from the generator through the generator outlet line 11 as well as the vapor entering from the high-pressure compressor stage outlet line 13 condenses rejecting heat to the condenser cooling medium and the condensate is formed. So formed condensate flows, first through the high-pressure throttle valve 16 in the condensate outlet line 15 flashing from the condenser pressure to the absorber pressure, then through the liquid-vapor separator 17 in which the flashed vapor is allowed to escape through the vapor bypass line 18 to the absorber vapor feedline 26. The liquid refrigerant separated in the liquid-vapor separator 17 flows through the low-pressure throttle valve 21 in the evaporator feedline 19 flashing from the absorber pressure to the evaporator pressure, then enters the evaporator 22 with a minute amount of flashed vapor in it.

The refrigerant which enters the evaporator 22, which is mostly cold liquid, evaporates at a low pressure hence producing a cold effect in the evaporator. The low-pressure vaporized refrigerant flows to the low-pressure compressor stage 30 through the compressor feedline 23. In the compressor 30 the refrigerant vapor is compressed from the evaporator pressure to the absorber pressure. The compressed vapor flows through the compressor outlet line 24, then splits into two streams; one stream flows through the absorber vapor feedline 26 to the absorber, and the other through the high-pressure compressor feedline 25 to the high-pressure compressor stage. The vapor stream which flows through the high-pressure compressor feedline 25 will be compressed to the condenser pressure by the high-pressure compressor stage 40. The compressed refrigerant, which is now at the condenser pressure, flows through the compressor outlet stream 13 to the condenser.

The shafts of the expander and the compressors are mechanically coupled through a mechanical power link 50, so that the total power requirement of the compressors and all shaft power loses are met by the power output of the expander.

As for the working of the generator/absorber subsystem, the hot, weak solution which exits the generator through the generator solution outlet 2 passes through the hot-side of the heat exchanger 10b, rejecting heat to the cold-side of the heat exchanger 10a. When the weak solution exits the heat exchanger through hot-side outlet 3 it will be somewhat low in temperature, as it has regenerated the heat to the strong solution which flows in the cold-side of the heat exchanger 10a. Eventually, the weak solution enters the absorber 5 through the solution blowdown valve 4. In the absorber, the warm weak solution meets the refrigerant vapor which flows into the absorber through the absorber vapor feedline 26. The absorption process which takes place in the absorber 5 manifests the same effects as described referring to the FIG. 1(a) embodiment.

Eventually, the strong solution exits the absorber 5 through the pump suction line 6 and is delivered to the generator pressure by the pump 7 through the cold-side inlet line 8 of the heat exchanger 10. The strong solution which flows through the cold-side 10a of the heat exchanger is heated from the heat rejected by the weak solution which flows in the hot-side 10b of the heat exchanger, and eventually flows into the generator through the generator solution feedline 9 and will be heated by the regenerative heat rejected by the VEPC condenser 35.

It should be highlighted as before (see FIG. 2(c)) that the refrigerant stream that flows through the high-pressure compressor stage 40 supplements the cold effect produced in the evaporator, to which the generator/absorber unit has no direct expense of generator heat, as this vapor stream does not flow through the generator/absorber subsystem.

In this embodiment, the low-pressure compressor stage 30 plays a major role in enhancing the system performance, namely it enables the absorber to operate at a higher pressure than the evaporator pressure. This in turn enables the weak solution which enters the absorber to absorb more refrigerant vapor. The net result is a threefold advantage, namely:

1. The rich solution which enters the generator can commence boiling at a much lower temperature;
2. The solution operating salt concentration range becomes lower for a given mass flow rate of the refrigerant vapor; and
3. The operating temperature range of the generator becomes lower.

All things considered, these advantages lead to the reduction in corrosion damage in the generator.

Based on the embodiment shown in FIG. 3, several performance improvements can be introduced. Among them, two improvements can be achieved by regenerating heat from one part of the system to another part of the system. Another two improvements can be achieved by introducing a two-phase ejector in which the motive stream is a liquid.

Figure 4A:
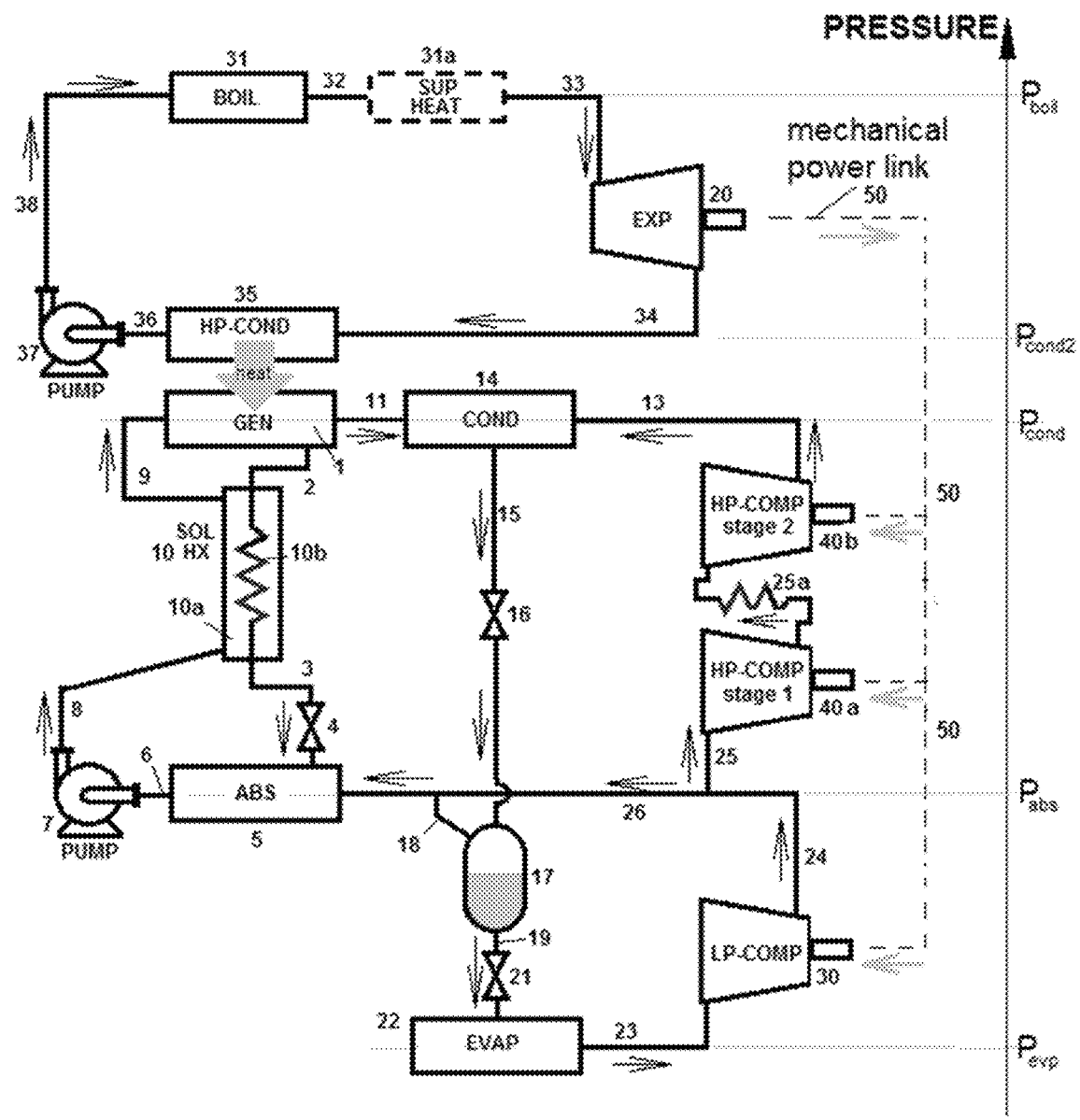
FIG. 4(a) is a schematic diagram of an Illustrative Embodiment 6 of the invention.
Figure 4B:
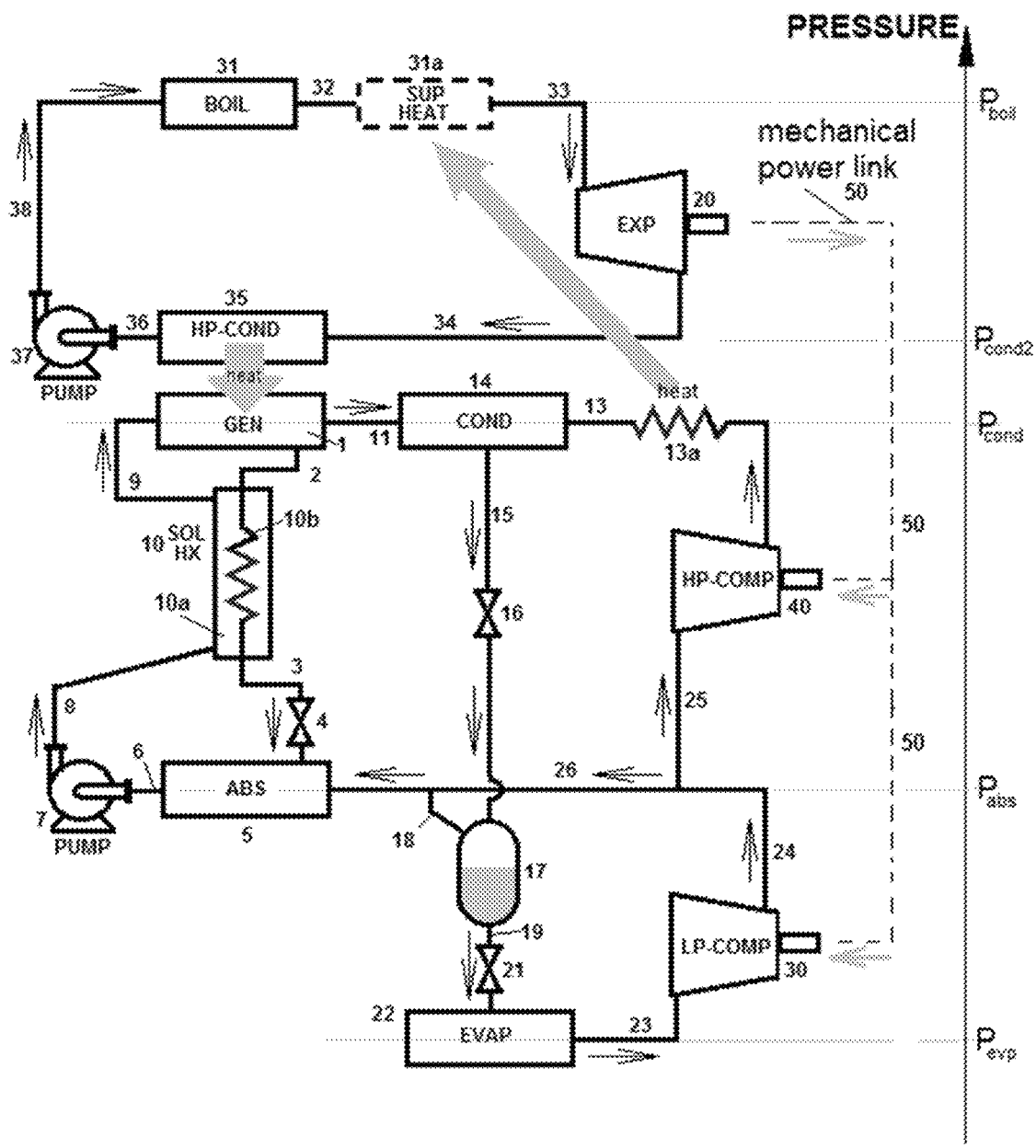
FIG. 4(b) is a schematic diagram of an Illustrative Embodiment 7 of the invention.

In predicting the performance of the embodiment for (Water+LiBr) system, it was revealed that the temperature of the water vapor which exits the high-pressure compressor stage 40 is in the range 170~195° C., which is almost the temperature of the superheater in the VEPC. This is a clear indication that the high-pressure compressor stage 40 is overdoing its duty, and further improvements to the system can be introduced, either by introducing heat regeneration or by splitting the high-pressure compression process into two stages and introducing intercooling between them. These two improvements and the resulting embodiments are described under the sections Embodiment 6 and 7 and are depicted in FIGS. 4(a) and 4(b).

It is noteworthy that in the embodiment shown in FIG. 3 the high-pressure condensate collects in the high-pressure condenser 35. On one hand this may seem as an advantage due to:

1. The pump work in the VEPC loop is reduced as it pumps between the relatively smaller pressure difference compared to, for example, the pressure difference between the VEPC boiler 31 and the low-pressure condenser 14 connected to the generator 1; and
2. The VEPC loop is independent of the rest of the system, therefore, not only it can be designed independently, but also one can select the most suitable working fluid for its purpose.

Figure 5A:
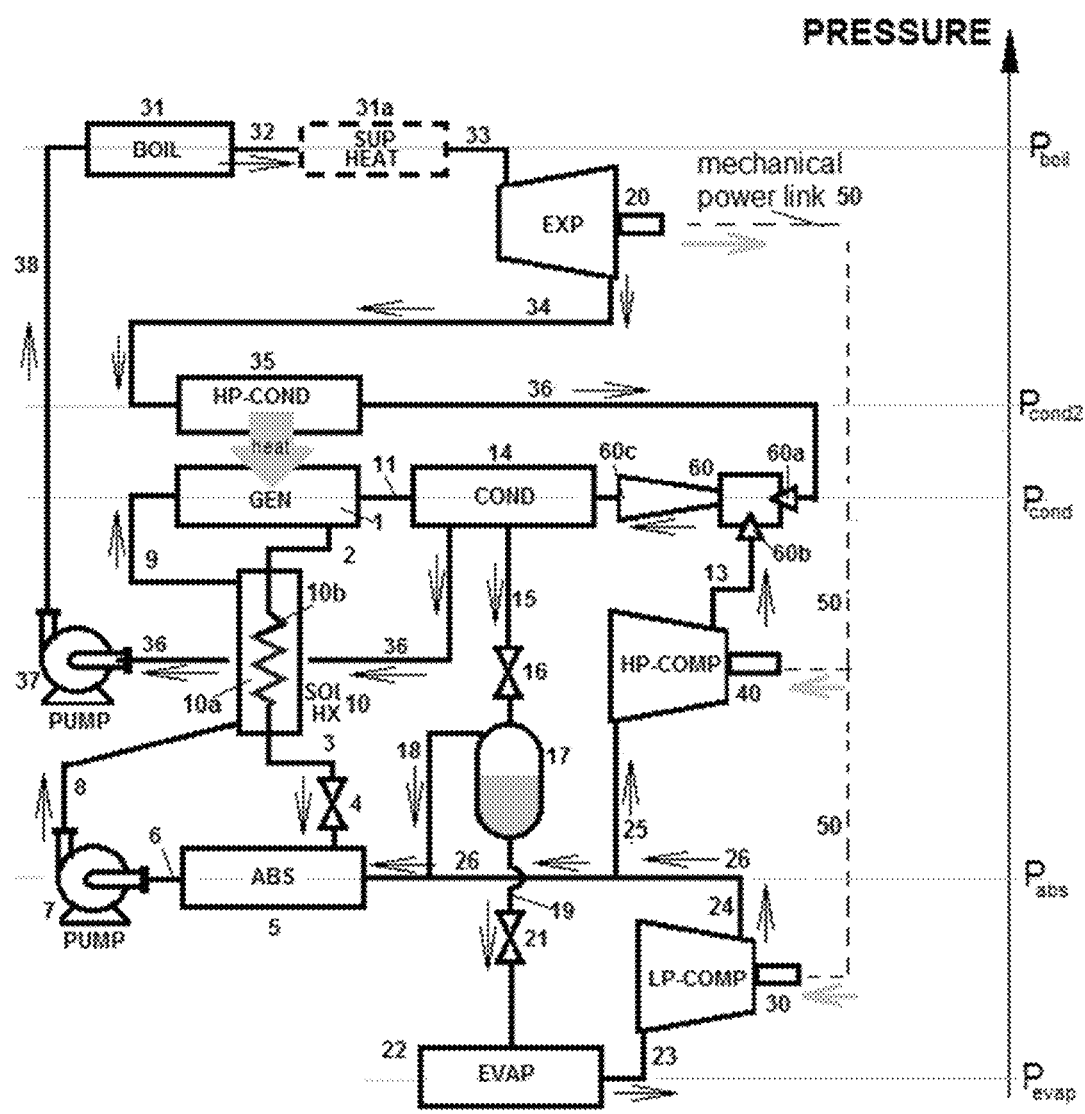
FIG. 5(a) is a schematic diagram of an Illustrative Embodiment 8 of the invention.
Figure 5B:
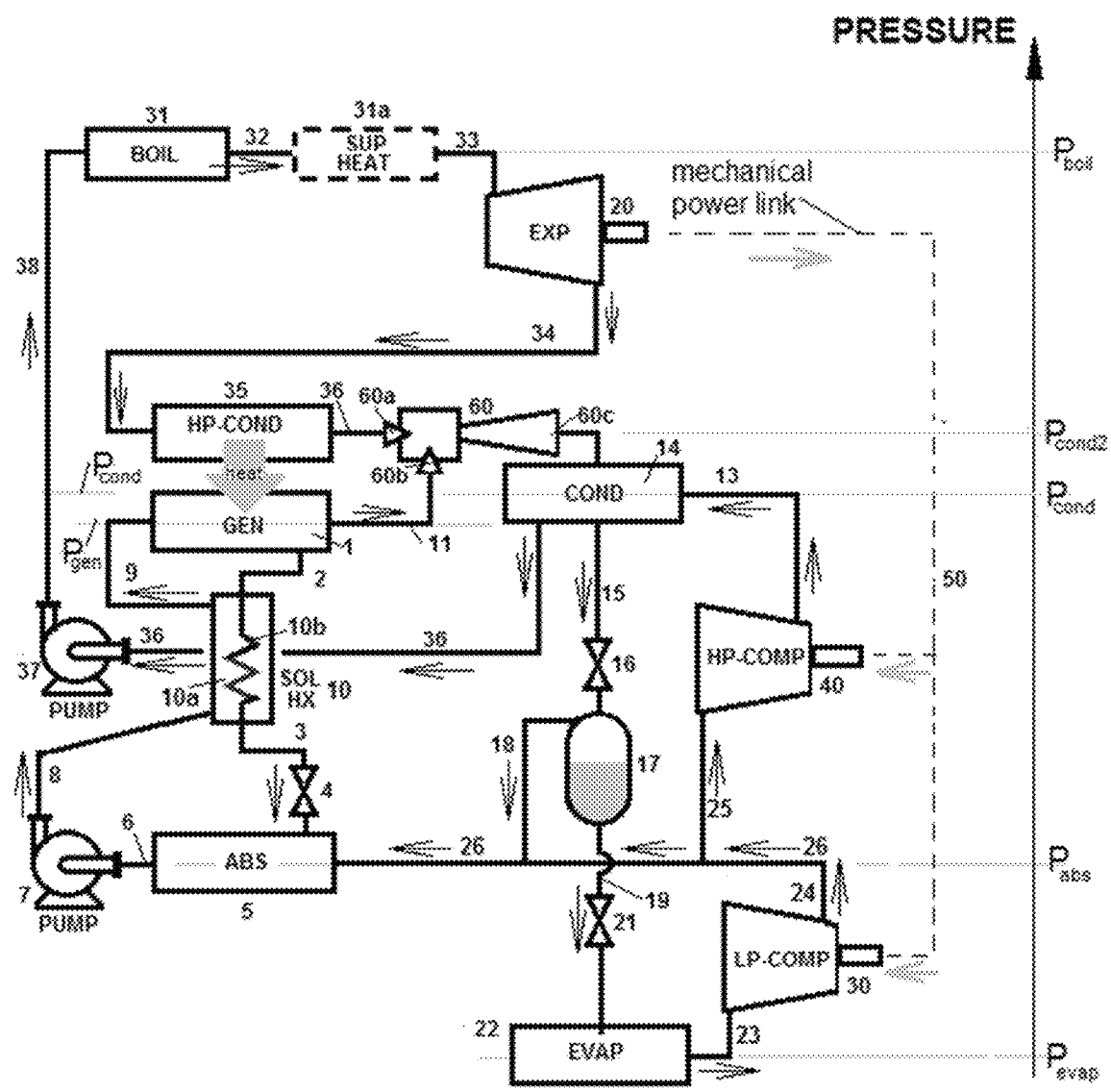
FIG. 5(b) is a schematic diagram of an Illustrative Embodiment 9 of the invention.

On the other hand, there exists the possibility of making use of the high-pressure condensate from the high-pressure condenser to enhance the performance of the rest of the system. These two improvements and the resulting embodiments are described under the sections Embodiment 8 and 9 and are depicted in in FIG. 5(a) and FIG. 5(b).

Illustrative Embodiment 6

The embodiment described here is shown in FIG. 4(a). The main difference between this embodiment and the Embodiment 5 described previously is that in this embodiment the high-pressure compressor stage 40 is split further into two stages, lower-pressure stage 40a and higher-pressure stage 40b, with an intercooler 25a introduced in between the two stages (40a and 40b). Despite this modification, the rest of the system operates as described in the previous section in reference to Embodiment 5. This modification reduces the high-pressure compressor stage power consumption, and thereby increasing the system COP.

It should be highlighted that the refrigerant stream that flows through the high-pressure compressor stages 40a and 40b supplements the cold effect produced in the evaporator, to which there is no direct expense of generator heat, as this vapor stream does not flow through the generator/absorber unit.

Illustrative Embodiment 7

In predicting the performance of the Embodiment 5, it was revealed that the temperature of the working fluid at the exit of the high-pressure compressor stage 40 is in the range 170~195° C., which is almost the temperature of the superheater in the VEPC. Thus, it is possible to make use of this high-temperature refrigerant to provide a portion of the heat input of the superheater, hence reducing the duty of the external heat source.

The embodiment described here is shown in FIG. 4(*b*). The main difference between this embodiment and the Embodiment 5 described in a previous section is that this embodiment is equipped with an additional heat exchanger to deliver heat from the flow passage 13*a* to the flow passage 32, thereby reducing the external heat provided by the superheater. In spite of this modification, the rest of the system operates as described in a previous section in reference to Embodiment 5.

It should be highlighted that the refrigerant stream which flows through the high-pressure compressor stage 40 supplements the cold effect produced in the evaporator, to which there is no direct expense of generator heat, as this vapor stream does not flow through the generator/absorber unit.

Illustrative Embodiment 8

This embodiment, as shown in FIG. 5(*a*), can be applied when the high pressure VEPC loop uses the same refrigerant that is used in the rest of the system. In this embodiment, the high-pressure refrigerant condensate in the high-pressure condenser 35 is used as the primary motive stream of a two-phase ejector 60 making the ejector pull the vapor output of the high-pressure compression stage 40 as the secondary stream, and thereby reducing the delivery pressure of the high-pressure compressor stage. Eventually, the ejector delivers its mixed output stream to the low-pressure condenser 14. As a result, now the high-pressure compressor stage works within a reduced pressure difference, hence, increases its mass throughput. This in turn increases the mass throughput of the evaporator, hence improving the overall system performance.

It should be noted that the incorporation of the ejector in this manner warrants some modification as to how the boiler feed pump 37 of the VEPC loop is connected. Since all the condensate in the high-pressure condenser 35 flows to the low-pressure condenser 14 as the motive stream of the ejector, the boiler feed pump 37 should pull the boiler feed, as shown in FIG. 5(*a*), from the low-pressure condenser 14, through the pump feedline 36. Apart from those modifications described here, the rest of the system operates as described in the previous section in reference to the Embodiment 5.

It should be highlighted that the refrigerant stream which flows through the high-pressure compressor stage 40 supplements the cold effect produced in the evaporator, to which there is no direct expense of generator heat, as this vapor stream does not flow through the generator/absorber unit.

Illustrative Embodiment 9

This embodiment, as shown in FIG. 5(*b*), can be applied when the high pressure VEPC loop uses the same refrigerant that is used in the rest of the system. In this embodiment, the high-pressure refrigerant condensate in the high-pressure condenser 35 is used as the primary motive stream of a two-phase ejector 60 making the ejector pull the vapor output of the generator 1 as the secondary stream, and thereby reducing the generator operating pressure to a value below the pressure of the low-pressure condenser 14. Eventually, the ejector delivers its mixed output stream to the low-pressure condenser 14.

It should be noted that, as in the case of Embodiment 8, the incorporation of the ejector in this manner warrants some modification as to how the boiler feed pump of the VEPC loop is connected. Since all the condensate in the high-pressure condenser 35 flows to the low-pressure condenser 14 as the motive stream of the ejector, the boiler feed pump 37 should pull the boiler feed, as shown in FIG. 5(*b*), from the low-pressure condenser 14, through the pump feedline 36. Other than those modifications described here, the rest of the system operates as described in the previous section in reference to the Embodiment 5.

The reduction of the generator pressure as presented in this embodiment has compounded advantages, namely:

1. It helps to lower the upper bound temperature of the generator 1;
2. It also lowers the pressure of the high-pressure condenser 35;
3. It marginally increases the pressure ratio across the expander 20; and
4. It further minimizes the potential corrosion damage to the generator 1.

Illustrative Embodiment 10

Figure 6:
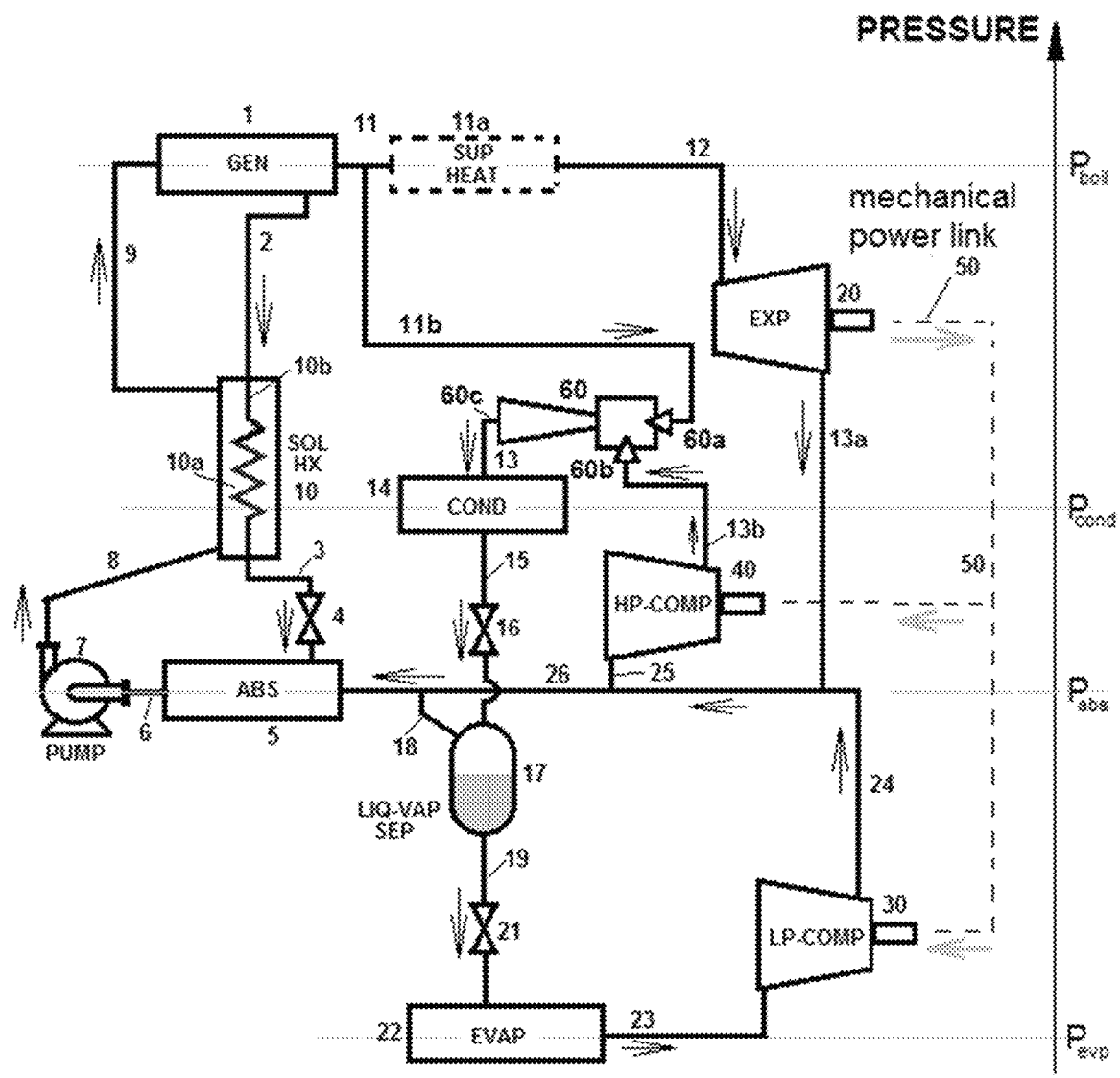
FIG. 6 is a schematic diagram of an Illustrative Embodiment 10 of the invention.

This illustrative embodiment which is shown in FIG. 6, for the most part resembles and fall in line with the embodiments presented so far. However, it is unique in the sense that it has the distinguished features combined from the illustrative embodiments 1 and 4.

The system comprises of three major subsystems, namely:
The combined VEPC driven VCRC unit which uses only the refrigerant as the working fluid, includes the mechanically coupled expander stages and the high-pressure and low-pressure compressor stages,
The ejector device which is driven by a second vapor stream from the generator which in turn entrains the output vapor stream of the high-pressure compressor stages solely feeds the condenser which in turn feeds the evaporator,
The refrigerant vapor generator/absorber unit which operates cycling a refrigerant-absorbent solution between the absorber and the generator, wherein the generator operates at a high pressure to supply the hot, high-pressure vapor, acts as the boiler to the VEPC-VCRC subsystem, while the absorber, which operates at a low pressure, which is lower than that of a traditional condenser, acts as the vapor condenser to the VEPC-VCRC subsystem.

The working of the embodiment can be described with reference to FIG. 6 as follows. A solution of a suitable refrigerant and an absorbent is circulated in the generator/absorber unit, thus the refrigerant in the solution is the working fluid of the VEPC-driven VCRC. The strong solution which is collected in the absorber 5 is delivered by the pump 7 to the generator 1 through the pump suction line 6, the pump delivery line 8, the cold-side of the solution heat exchanger 10*a*, and then through the generator solution feedline 9. In the generator 1, the strong solution is heated and a portion of the refrigerant constituent in the solution is vaporized and expelled through the generator vapor outlet line 11. The resulting hot weak solution flows from the generator 1 to the absorber 5 through the solution outlet line 2, the hot-side of the solution heat exchanger 10*b*, the absorber solution feedline 3, and then through the solution blowdown valve 4. The heat exchanger 10 enhances the performance of the generator/absorber unit as it regenerates the heat from the hot-side of the heat exchanger 10*b* to the cold-side of the heat exchanger 10*a*, thus reducing the heat duty of the generator as well as of the absorber. The solution completes its cycle by entering the absorber 5 and absorbing the vapor which enters the absorber through the absorber vapor feedline 26, thus enriching the solution with the refrigerant which collects in the absorber 5.

The generator expels high pressure, high temperature vapor through the vapor outlet line 11. This vapor stream is divided into two streams, and one flows to the primary port 60*a* of the ejector 60 through the ejector primary feedline 11*b* while the other stream flows to the expander 20, through the optional superheater 11*a* and then through the expander inlet line 12.

In the expander, the vapor expands to the absorber pressure producing mechanical power which will be delivered through the expander shaft. The expanded vapor, now at the absorber pressure, leaves the expander through the expander outlet line 13*a*.

The high pressure, high temperature stream 11*b* which enters the ejector 60 through the ejector primary port 60*a*, expands through the ejector primary nozzle to a low pressure while the stream velocity increases to a very high level. The high-speed primary stream entrains the secondary stream which enters from the ejector secondary port 60*b*, and the two streams mix in the ejector mixing chamber while the momentum and the energy transfer takes place between the streams. The resulting mixed stream, now at an intermediate high velocity, passes through the diffuser section of the ejector where it decelerates, and the stream pressure increases. Finally, the mixed stream leaves the ejector through its delivery port 60*c* at the condenser pressure and enters the condenser through the condenser feedline 13. As FIG. 6 shows the ejector secondary stream 13*b* is extracted from the outlet of the high-pressure compressor stages 40 which compresses a portion of the vapor at the absorber pressure in the absorber vapor feedline 26 thereby somewhat reducing the absorber duty.

In the condenser 14, the refrigerant vapor condenses rejecting heat to the condenser cooling medium. The resulting condensate flows through the throttle valves and flashes into the evaporator 22. As depicted in FIG. 6, the condensate flashing occurs in two stages to improve the system performance. First the vapor expands from the condenser pressure to the absorber pressure through the high-pressure throttle valve 16 in the condenser outlet line 15. The resulting flashed refrigerant passes through a liquid-vapor separator 17, where the flashed vapor is allowed to escape through the vapor bypass line 18 to the absorber vapor feedline 26 and eventually flows to the absorber 5. The separated liquid in the separator 17 further expands from the absorber pressure to the evaporator pressure through the second, low-pressure throttle valve 21 in the evaporator feedline 19.

The flashed refrigerant which is mostly liquid, evaporates at a low pressure in the evaporator 22 hence producing a cold effect in the evaporator. The low-pressure vaporized refrigerant flows to the low-pressure compressor stage 30 through the compressor feedline 23. In the compressor 30 the refrigerant vapor is compressed from the evaporator pressure to the absorber pressure. The compressed vapor flows through the compressor outlet line 24, then splits into two streams; one stream flows through the absorber feedline 26 and the other through the high-pressure compressor feedline 25. The vapor stream which flows through the high-pressure compressor feedline 25 will be compressed to a pressure somewhat lower than the condenser pressure by the high-pressure compressor stage. So compressed vapor stream 13*b* enters the ejector through the ejector secondary port 60*b* which is then entrained and compressed to the condenser pressure by the primary stream of the ejector. The ejector discharge eventually enters the condenser.

As shown schematically in FIG. 6, a mechanical power link 50 between the expander 20 and the compressor stages 30, 40 ensures that the total power consumption of all compressor stages and all mechanical shaft losses are provided by the expander power output.

Comparison of the current embodiment with the embodiment 1 reveals that in the current embodiment the secondary stream 60*b* enters the ejector 60 at a somewhat higher pressure than that of the embodiment 1 due to the high-pressure compressor 40. Similarly, the comparison of the current embodiment with the embodiment 4 reveals that in the current embodiment the high-pressure compressor stage 40 works at a lower pressure ratio than that of the embodiment 4 due to the ejector device 60. Another observation is that the expander 20 is working across a larger pressure ratio than that of the embodiment 4. All these factors in combination enhance the vapor output through the discharge port 60*c* of the ejector 60 for a given flow rate in the primary stream 11*b*.

It is noteworthy that the refrigerant stream that flows through the high-pressure compressor stage 40 and then further entrained and compressed in the ejector 60, supplements the cold effect produced in the evaporator, to which the generator/absorber unit has no direct dependence, as this vapor stream does not flow through the generator/absorber unit. Thus, there is no direct generator heat expense associated with the production of this stream of refrigerant.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A heat pump system, comprising:
   an absorber, the absorber operating at an absorber pressure, the absorber generating a solution that is highly concentrated in refrigerant;
   a generator fluidly coupled to the absorber, the generator heating the solution that is highly concentrated in refrigerant so as to produce refrigerant vapor;
   a plurality of fluid feedlines fluidly coupling the absorber to the generator, a first one of the plurality of fluid feedlines comprising a generator solution feedline through which the solution that is highly concentrated in refrigerant flows from the absorber to the generator, a second one of the plurality of fluid feedlines comprising an absorber solution feedline through which the solution that is low in refrigerant concentration flows from the generator to the absorber;

a solution circulation pump fluidly coupled to the absorber and the generator in the generator solution feedline, the solution circulation pump raising the pressure of the solution highly concentrated in refrigerant that is discharged from the absorber;

a solution heat exchanger comprising thermally coupled a cold side and a hot side, the solution heat exchanger being disposed on the generator solution feedline between the generator and the circulation pump and on the absorber solution feedline, the solution with the high concentration of refrigerant that is discharged by the solution circulation pump passing through the cold side to the generator feedline, the solution with the low concentration of refrigerant that is discharged by the generator passing through the hot side to the absorber solution feedline, and thereby the solution with high concentration of refrigerant passing through the generator feedline is being heated by the solution with the low concentration of refrigerant passing through the absorber solution feedline;

an expander fluidly coupled to the generator, the expander having one or more vapor expander stages to produce mechanical power, a first portion of the refrigerant vapor produced in the generator being fed to the one or more expander stages of the expander so as to be expanded to a condenser pressure and/or to the absorber pressure, and accordingly the first portion of the refrigerant vapor flowing into a condenser and/or into the absorber through an absorber vapor feedline;

a condenser, the condenser being fluidly coupled to the generator through a pressure reduction device or to the expander so that the condenser is fed with a second portion of the refrigerant vapor produced in the generator or with the first portion of the refrigerant vapor from a port in the expander, the condenser operating at a condenser pressure;

an evaporator fluidly coupled to the condenser, the evaporator operating at an evaporator pressure, wherein condensate discharged from the condenser is fed into the evaporator;

a first compressor fluidly coupled to the evaporator and operatively coupled to the expander, the first compressor having one or more vapor compressor stages driven by the mechanical power generated by the one or more vapor expander stages of the expander, wherein the refrigerant vapor produced in the evaporator is compressed by the one or more vapor compressor stages of the first compressor to the absorber pressure, and accordingly the compressed refrigerant vapor that exits the first compressor flows into the absorber vapor feedline; and a plurality of throttle valves, a first one of the plurality of throttle valves being disposed in the absorber solution feedline, and a second one of the plurality of throttle valves being disposed between the condenser and the evaporator;

wherein the generator operates at a pressure higher than the condenser pressure, the absorber pressure is intermediate to the condenser pressure and the evaporator pressure.

2. The heat pump system according to claim 1, further comprising a vapor superheater fluidly coupled to the generator and the expander, the first portion of the refrigerant vapor produced in the generator, which is fed to the one or more expander stages of the expander, is heated further by the superheater to a superheated temperature.

3. The heat pump system according to claim 1, wherein the condensate that is discharged from the condenser and fed into the evaporator expands through a first high pressure throttle stage and a second low pressure throttle stage, the condensate expanding from the condenser pressure to the absorber pressure in the first high pressure throttle stage, the condensate expanding from the absorber pressure to the evaporator pressure in the second low pressure throttle stage, while a liquid-vapor separator comprising a vapor escape line which is fluidly coupled to the absorber vapor feedline is disposed between the two throttle stages, so that vaporized refrigerant created in the first high pressure throttle stage is allowed to escape to the absorber vapor feedline, and only separated liquid refrigerant is allowed to throttle through the second low pressure throttle stage which enters the evaporator.

4. The heat pump system according to claim 1, wherein a first portion of the refrigerant vapor expands to the condenser pressure in the one or more expander stages of the expander and enters the condenser, and a second portion of the refrigerant vapor expands further to the absorber pressure in the one or more expander stages of the expander and enters the absorber.

5. The heat pump system according to claim 4, wherein the second portion of the refrigerant vapor produced in the generator which is fed to the condenser through the pressure reduction device is blocked, thereby making the flow rate through a fluid coupling between the generator and the condenser equal to zero.

6. The heat pump system according to claim 1, wherein a total amount of the refrigerant vapor leaving the one or more expander stages of the expander enters the condenser.

7. The heat pump system according to claim 6, wherein the second portion of the refrigerant vapor produced in the generator which is fed to the condenser through the pressure reduction device is blocked, thereby making the flow rate through a fluid coupling between the generator and the condenser equal to zero.

8. The heat pump system according to claim 7, further comprising a second high pressure compressor having one or more high pressure compressor stages, wherein the one or more vapor expander stages of the expander produce surplus mechanical power that powers the second high pressure compressor, the second high pressure compressor operating between the absorber pressure and the condenser pressure and being fed by a portion of refrigerant vapor output by the one or more vapor compressor stages of the first compressor that forms a supplementary refrigerant stream, thereby facilitating the bypassing of the absorber vapor feedline by the supplementary refrigerant stream, and hence having no expense of generator heat to produce the supplementary refrigerant stream.

9. The heat pump system according to claim 8, wherein the mechanical power requirement of the one or more vapor compressor stages of the first compressor and the one or more high pressure compressor stages of the second high pressure compressor, and all shaft losses are totally met by the mechanical power produced by the one or more vapor expander stages of the expander, thereby maintaining a mechanical power balance between all vapor compressor stages and all vapor expander stages.

10. The heat pump system according to claim 8, wherein the one or more vapor expander stages produce mechanical power in excess of the total power consumption of one or more vapor compressor stages of the first compressor, the one or more high pressure compressor stages of the second high pressure compressor, all shaft losses, and the excess mechanical power so produced is harnessed by an electric generator and delivered to a power system or to a power storage device.

11. The heat pump system according to claim 1, wherein a total amount of the refrigerant vapor leaving the one or more expander stages of the expander enters the absorber.

12. The heat pump system according to claim 11, wherein the pressure reduction device a fluidly coupling the generator and the condenser comprises a vapor-driven ejector, the vapor-driven ejector having a primary inlet port, a secondary inlet port, and a discharge port, the second portion of the refrigerant vapor produced in the generator being fed into the primary inlet port of vapor driven ejector as a primary stream of vapor, the primary stream of vapor expanding through the vapor-driven ejector so as to entrain a secondary stream of vapor from the absorber vapor feedline that is fed into the secondary inlet port of vapor-driven ejector, and a mixed stream comprising the primary and secondary streams of vapor being discharged out of the discharge port of the vapor-driven ejector and flowing into the condenser.

13. The heat pump system according to claim 1, further comprising a second high pressure compressor having one or more high pressure compressor stages, wherein the one or more vapor expander stages of the expander produce surplus mechanical power that powers the second high pressure compressor; and wherein a fluid coupling between the generator and the condenser comprises a vapor-driven ejector, the vapor-driven ejector having a primary inlet port, a secondary inlet port, and a discharge port, the second portion of the refrigerant vapor produced in the generator being fed into the primary inlet port of the vapor-driven ejector as a primary stream of vapor, the primary stream of vapor expanding through the vapor-driven ejector so as to entrain a secondary stream of vapor exiting the one or more high pressure compressor stages of the second high pressure compressor that is fed into the secondary inlet port of vapor-driven ejector, and a mixed stream comprising the primary and secondary streams of vapor being discharged out of the discharge port of the vapor-driven ejector and flowing into the condenser, so that the second high pressure compressor operates between the absorber pressure and a pressure lower than the condenser pressure and is fed by a portion of refrigerant vapor output by the one or more vapor compressor stages of the first compressor.

14. The heat pump system according to claim 13, wherein the mechanical power requirement of the one or more vapor compressor stages of the first compressor and the one or more high pressure compressor stages of the second high pressure compressor, and all shaft losses are totally met by the mechanical power produced by the one or more vapor expander stages of the expander, thereby maintaining a mechanical power balance between all vapor compressor stages and all vapor expander stages.

15. The heat pump system according to claim 13, wherein the one or more vapor expander stages of the expander produce mechanical power in excess of the total power consumption of one or more vapor compressor stages of the first compressor, the one or more high pressure compressor stages of the second high pressure compressor, all shaft losses, and the excess mechanical power so produced is harnessed by an electric generator and delivered to a power system or to a power storage device.

* * * * *